Dec. 12, 1967 C. V. JONES, SR., ET AL 3,357,167

AUTOMATION SYSTEM FOR SPINNING FRAMES

Filed May 11, 1966

10 Sheets-Sheet 1

INVENTORS.
COY V. JONES, SR.
WALTER ENGELS

BY B.P. Fishburne, Jr.

ATTORNEY

Dec. 12, 1967 C. V. JONES, SR., ET AL 3,357,167

AUTOMATION SYSTEM FOR SPINNING FRAMES

Filed May 11, 1966 10 Sheets-Sheet 2

INVENTORS.
COY V. JONES, SR.
WALTER ENGELS
BY B. P. Fishburne, Jr.
ATTORNEY.

INVENTORS.
COY V. JONES, SR.
WALTER ENGELS
BY B. P. Fishburne, Jr.
ATTORNEY.

INVENTORS.
COY V. JONES, JR.
WALTER ENGELS

BY B. P. Fishburne, Jr.
ATTORNEY

INVENTORS.
COY V. JONES, SR.
WALTER ENGELS
BY
B. P. Fishburne, Jr.
ATTORNEY

INVENTORS.
COY V. JONES, SR.
WALTER ENGELS

BY B. P. Fishburne, Jr.
ATTORNEY

AUTOMATION SYSTEM FOR SPINNING FRAMES

Filed May 11, 1966 10 Sheets-Sheet 7

INVENTORS.
COY V. JONES, SR.
WALTER ENGELS
BY B. P. Fishburne, Jr.
ATTORNEY.

AUTOMATION SYSTEM FOR SPINNING FRAMES

INVENTORS.
COY V. JONES, SR.
WALTER ENGELS

BY B. P. Fishburne, Jr.

ATTORNEY.

INVENTORS.
COY V. JONES, SR.
WALTER ENGELS
BY
B.P. Fishburne, Jr.
ATTORNEY.

AUTOMATION SYSTEM FOR SPINNING FRAMES

Filed May 11, 1966 10 Sheets-Sheet 10

INVENTOR.
COY V. JONES, SR.
WALTER ENGELS
BY
B. P. Fishburne, Jr.
ATTORNEY.

United States Patent Office 3,357,167

Patented Dec. 12, 1967

3,357,167

AUTOMATION SYSTEM FOR SPINNING FRAMES

Coy V. Jones, Sr., Greer, S.C., and Walter Engels, Tryon, N.C., assignors to Southern Machinery Company, Greer, S.C., a corporation of South Carolina Filed May 11, 1966, Ser. No. 549,218
24 Claims. (Cl. 57—54)

This invention relates to spinning frames and to an automation system therefor.

The invention constitutes an improvement upon the automatic control system for spinning frames disclosed in prior United States Patent 3,124,925 to H. R. Kennedy et al.

In general, the present invention renders the control and operation of the spinning frame more completely automatic and trouble-free than did the system in the above prior patent. The present invention system includes a number of separate and distinct automation components which may be used together to render the spinning frame substantially completely automatic, or, in some instances, various combinations of components may be employed to provide semi-automatic spinning frames including only such automation features as are desirable for particular installations. In this latter connection, the invention is highly flexible in its capabilities and therein resides one of the principal objects of the invention.

Another objective is to overcome certain shortcomings or deficiencies of the system in said prior Patent 3,124,925. Among the prior art deficiencies which are completely overcome by the invention are the following: In the prior art system, the ring rail shifts into the tip bunch position from the upper dead point of the builder stroke. When the tip bunch is removed later, the package-yarn-end of the tip bunch must be pulled off of the smallest bobbin diameter, causing high stress on this yarn end, and often breakage. In the prior system, there was also a difficulty caused by the fine adjustment necessary on the micro-switch in the ring rail release solenoid, to secure coaction of the ring rail locking means and wind-down clutch disengagement. This rather critical arrangement has been dispensed with without any loss in the utility of the system. Also, in the prior system, there was a lack of overload protection in the ring rail wind-down mechanism which resulted in breakage of gears and clutch parts where overloads occurred for some reason during the wind-down motion or where the clutch elements failed to properly engage.

Another disadvantage now overcome is in the need for manual unloading of the internal locking device within the ring rail wind-down unit in order to achieve release of it by electromagnetic means. Additionally, the necessity for manually rewinding the builder chain has now been eliminated, as well as the need for manual shaking of the ring rail. All of these and other deficiencies of the prior system are effectively eliminated in the present invention system.

In the prior system, Patent 3,124,925, the following operations now rendered automatic or eliminated were done manually. It was necessary to bear down by hand on the ring rail to release pressure on the internal locking device of the ring rail wind-down unit. Simultaneously, it was necessary to manually press the ring rail release button to disengage the locking device electromagnetically. It was necessary to manually rewind the builder chain, to press the start button, to energize the main spinning frame motor, and to simultaneously shake the ring rail in some instances.

Briefly stated, the invention automation system produces the following functions:

Senses the fullness of the yarn package on the bobbin;

Releases the ring rail into the tip bunch position from any desired ring rail position during the building stroke by delaying actuation of the tip bunch escapement unit from the time at which the fullness of bobbins was sensed and renders adjustable the above time delay feature;

Permits adjustment of the number of wraps of yarn in the tip bunch;

Lowers the ring rail to the doff position with a speed fixed in ratio to the delivery speed of the spinning frame front draft roll;

Renders adjustable the ratio between delivery speed of the front draft roll and the ring rail lowering speed, within the limits of 1½ wraps and 3 wraps at wind-down;

Holds the ring rail securely in the doff position and renders adjustable the position of the ring rail for doffing;

De-energizes the main spinning frame motor and renders adjustable the time point at which the main motor is de-energized independently of other functions to assure a minimum number of yarn wraps on the butt of the bobbin or the spindle in the doff position, thus eliminating the need for a cylinder brake in the spindle drive system;

Rewinds the builder chain automatically;

Releases the ring rail automatically into the start up position after the stop and release button is pressed, and renders the start and shake button ineffective before the ring rail is released into start up position, so that the spinning frame cannot be started when the ring rail is locked in the doffing position;

Pulls the ring rail downwardly quickly a sufficient distance, simultaneously with the start-up of the motor, to remove possible kinks in the yarn, and releases it slowly upwardly in a controlled manner;

Provides a signal light installed in an easily visible location to indicate when the automatic control system is in cycle; and Allows the signal light to be installed remotely in a master panel if desired.

Other objects and advantages of the invention will be apparent during the course of the following detailed description.

In the accompanying drawings forming a part of this application and in which like numerals are employed to designate like parts throughout the same, FIGURE 1 is a fragmentary partly diagrammatic front elevation of a spinning frame equipped with the automation system or components of the present invention, parts omitted for simplicity;

Figure 8:
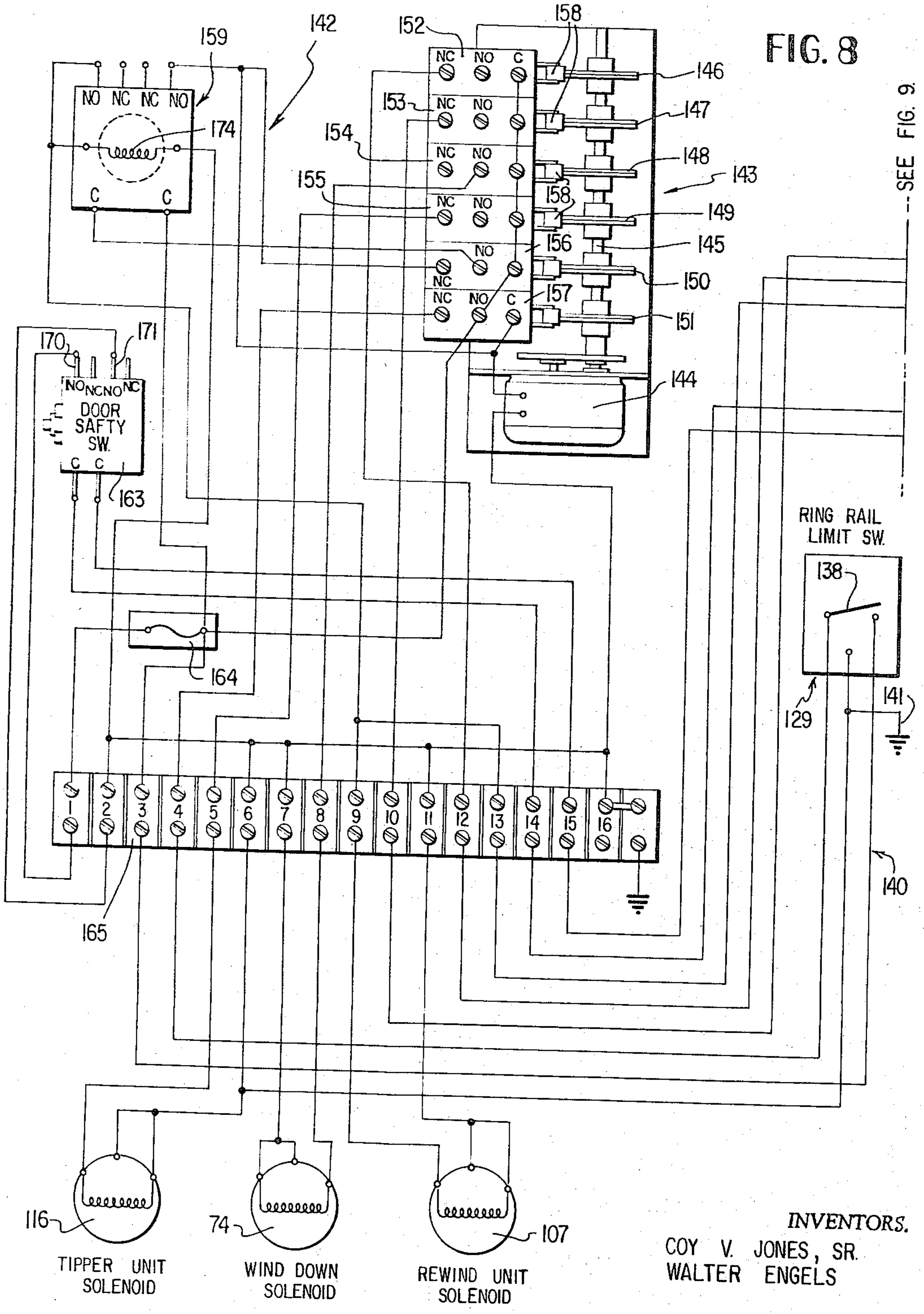
Figure 9:
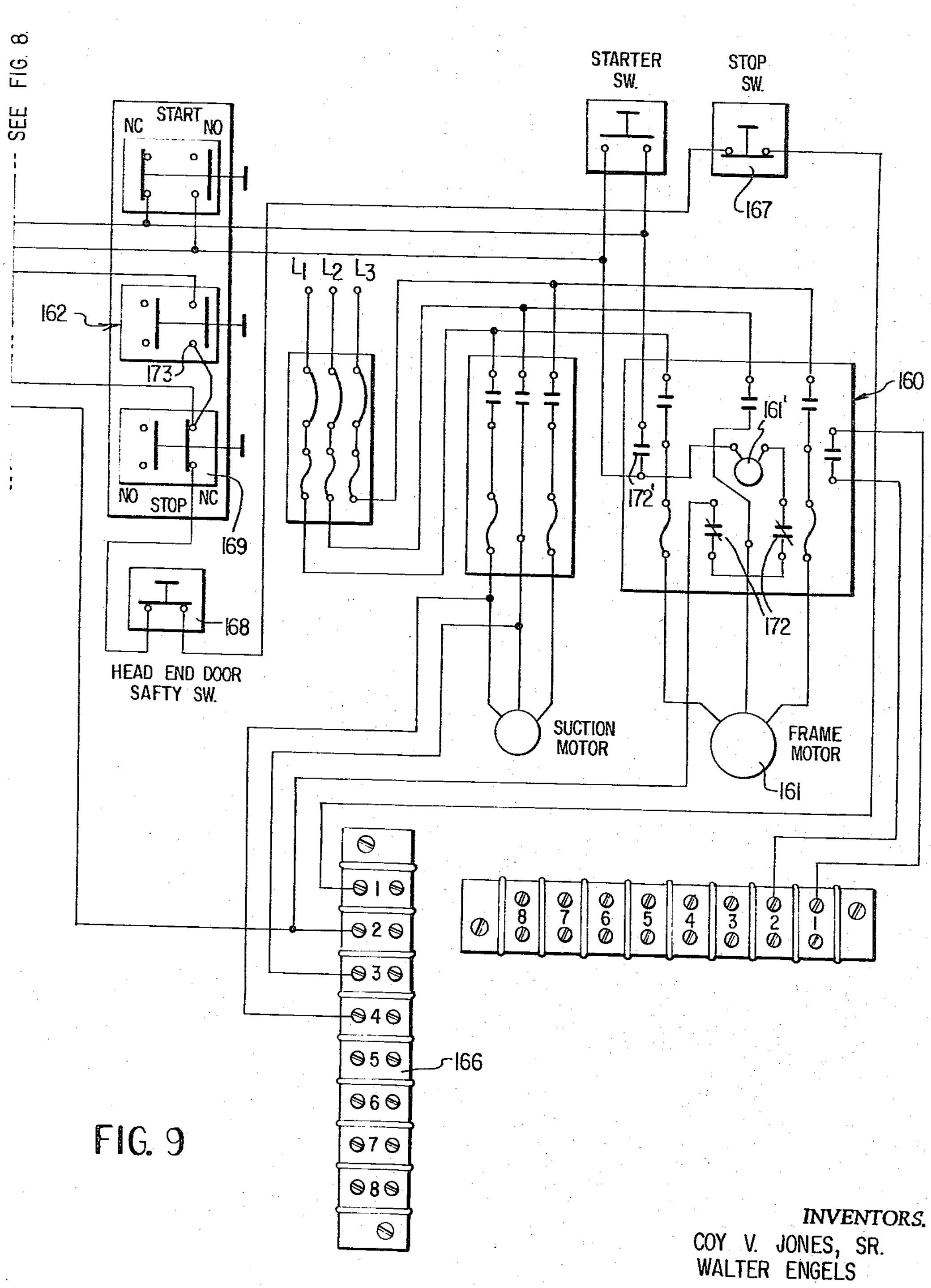
Figure 10:
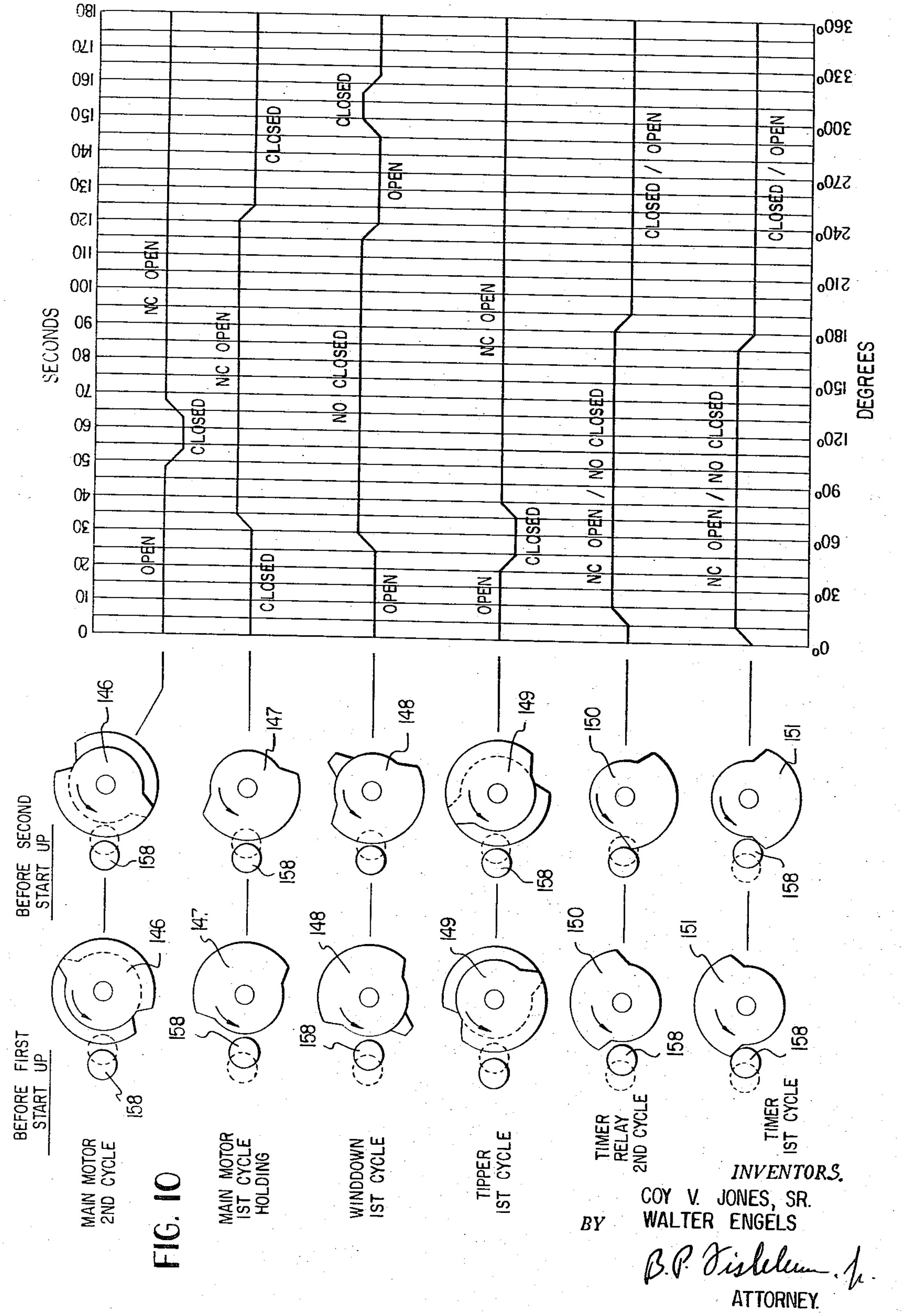
Figure 11:
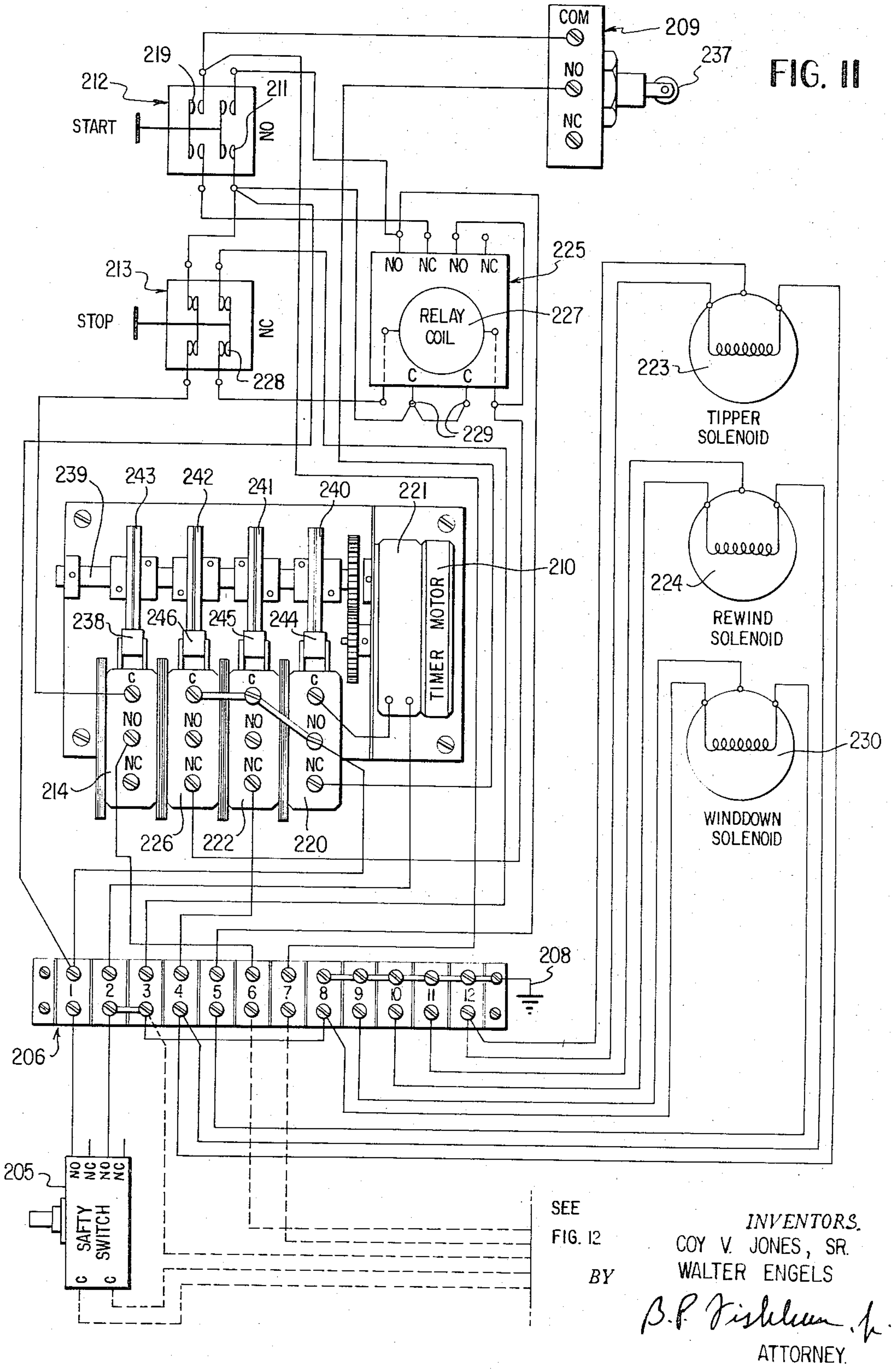
Figure 12:
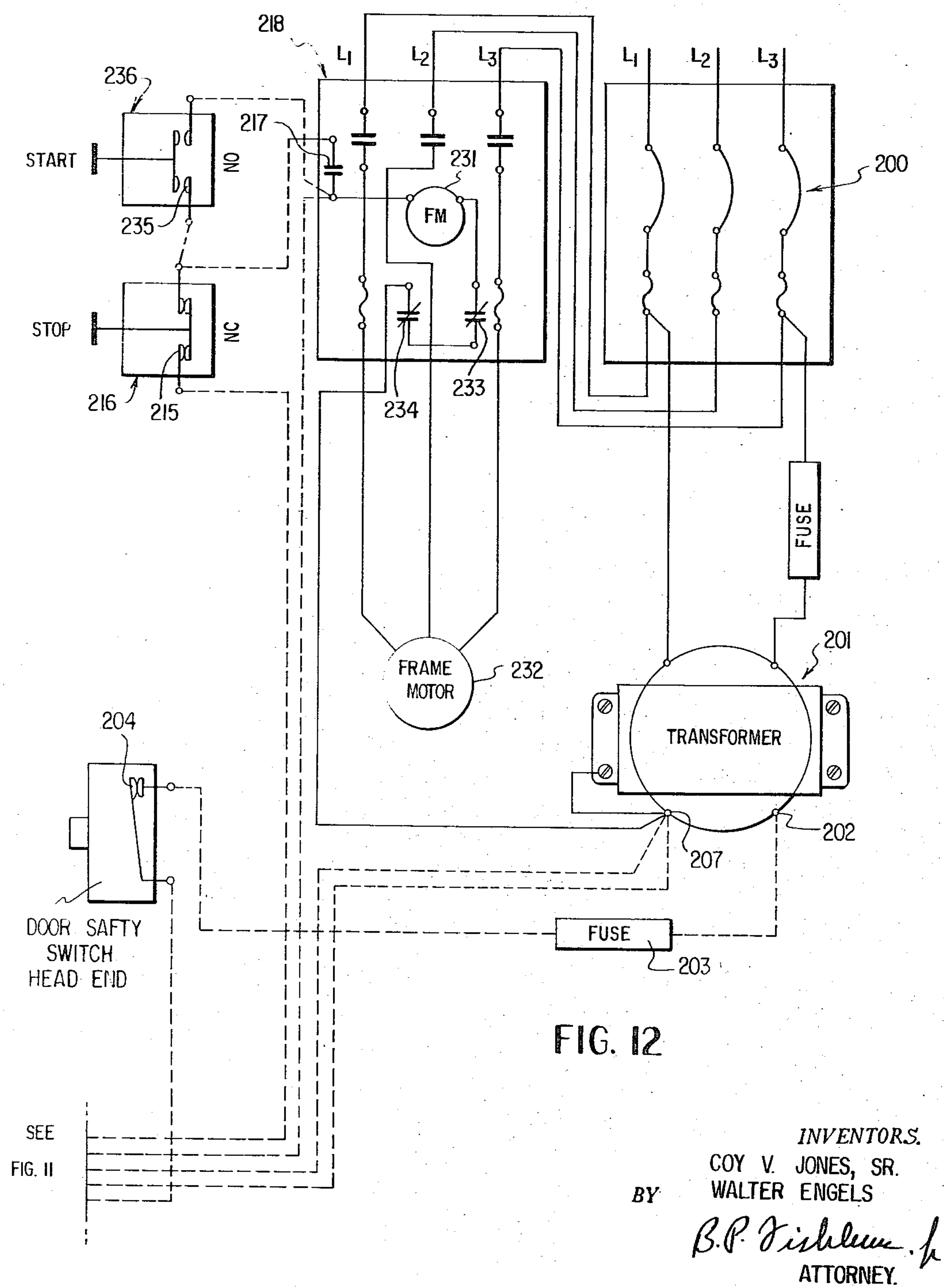
Figure 13:
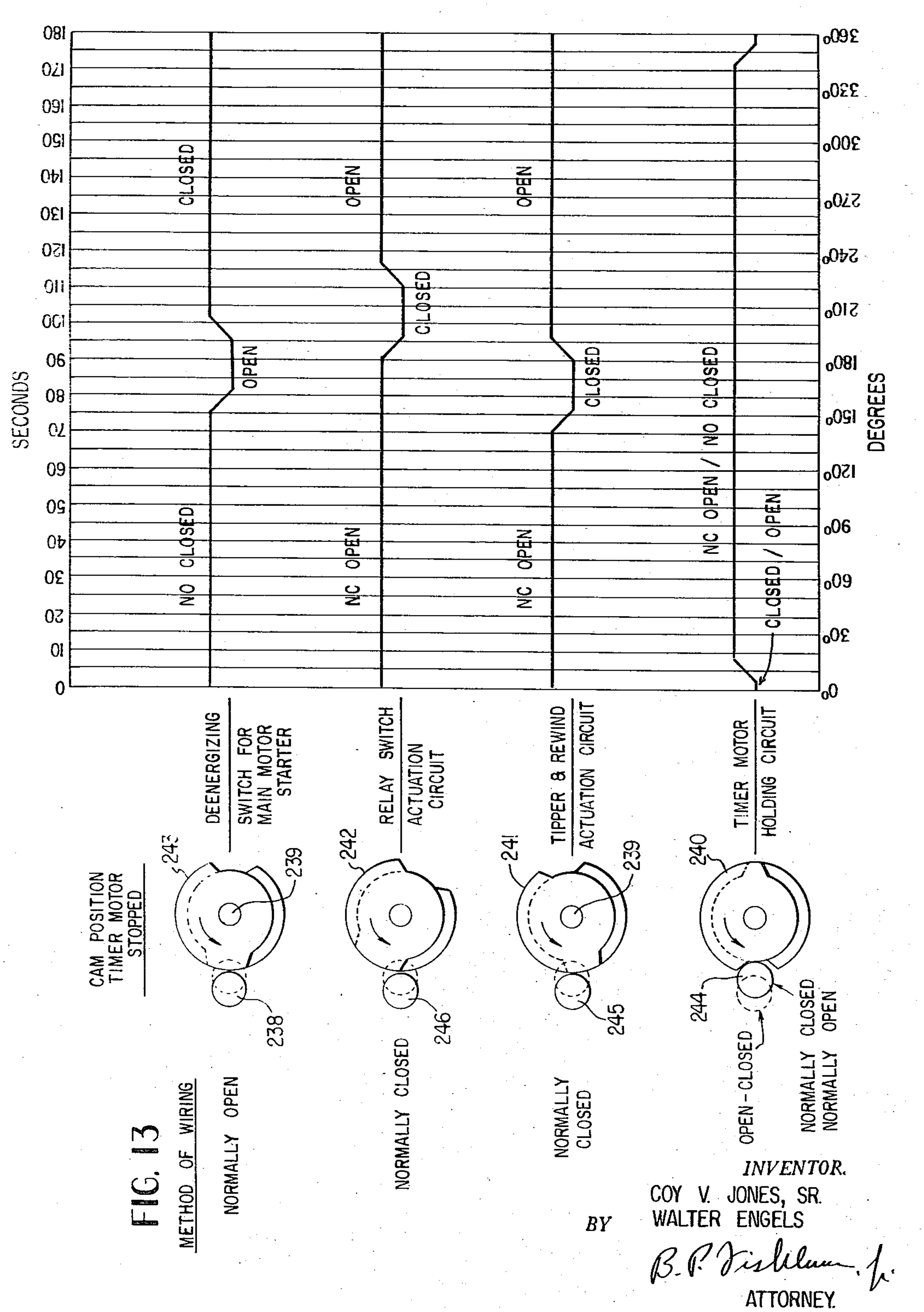

FIGURES 8 and 9 together constitute a wiring diagram for the electrical control unit of the system;

FIGURE 10 is a diagrammatic view illustrating timer cams and the time cycle produced by said cams;

FIGURES 11 and 12 taken together show a wiring diagram for the electrical control means in a modification and preferred form of the system; and FIGURE 13 is a diagrammatic view of timer cams and a time cycle produced by said cams in said modification.

Figure 1:
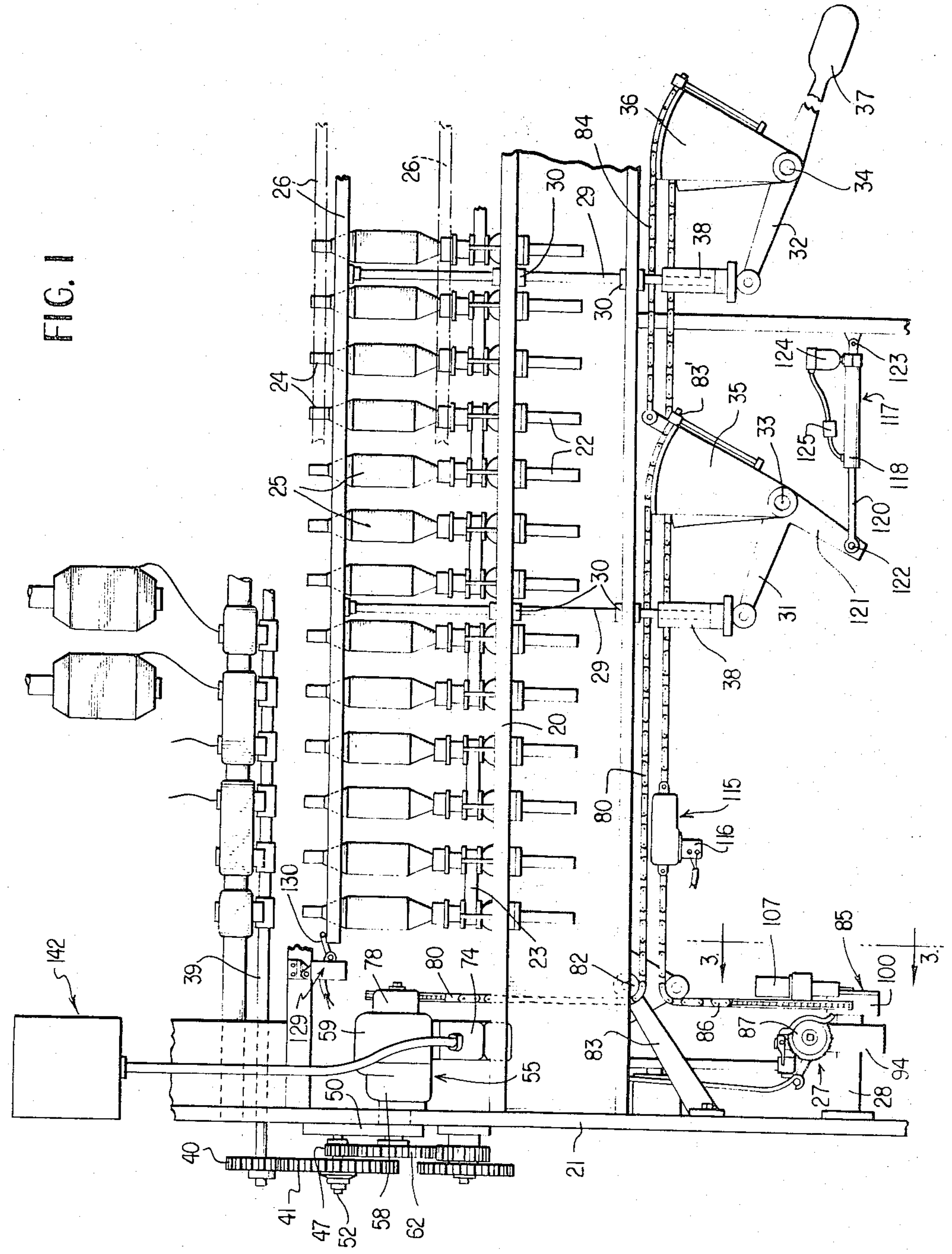

In the drawings, wherein for the purpose of illustration are shown preferred embodiments of the invention, attention is directed first to FIGURE 1 wherein a portion of a movable ring rail type spinning frame is shown, comprising a stationary spindle rail 20 having its ends connected with and supported by the head ends of the spinning frame, one head end being shown at 21. The spindle rail 20 supports the usual rotary spindles 22 rotatably, having flexible tape drive means 23 of conventional and well-known character. The spindles 22 receive and support bobbins 24 upon which the yarn package 25 is built or wound during the operation of the spinning frame.

The spinning frame further comprises a vertically oscillating ring rail 26 having rings and travelers, not shown, to guide the yarn onto the bobbins during oscillation and gradual rising of the ring rail under influence of a conventional builder motion 27, having a support arm 28 rigid with the head end 21.

The ring rail 26 is bodily mounted upon plural vertically shiftable lifter rods 29, only two of which are shown in FIGURE 1, having guided engagement within bearings 30 on the stationary spindle rail 20. The lower ends of lifter rods 29 directly engage lifter arms or cranks 31, 32, etc., rigidly mounted upon rocker shafts 33, 34, etc. which are spaced below the spindle rail 20 and supported in conventional bearings, not shown. Arcuate sectors 35, 36, etc. are also rigidly secured to the rocker shafts 33, 34, etc. The lifter arms or cranks 31, 32, etc. are provided on the other side of the several rocker shafts with counterweighted extensions 37 or comparable spring means to bias the arms 31, 32, etc. upwardly, tending to elevate the ring rail 26. Upward movement of the ring rail may be positively limited by stop sleeves 38 on the lifter rods 29 which abut the bottoms of bearings 30 on the spindle rail 20. All of the construction thus far described is substantially conventional and typical of spinning frames of the type shown in Patent 3,124,925 and other prior patents.

With continued reference to FIGURE 1, the spinning frame front draft roll 39 revolves continuously during the operation of the spinning frame and has a gear 40 secured thereto, meshing continuously with a relatively large intermediate reduction gear 41.

Figure 2:
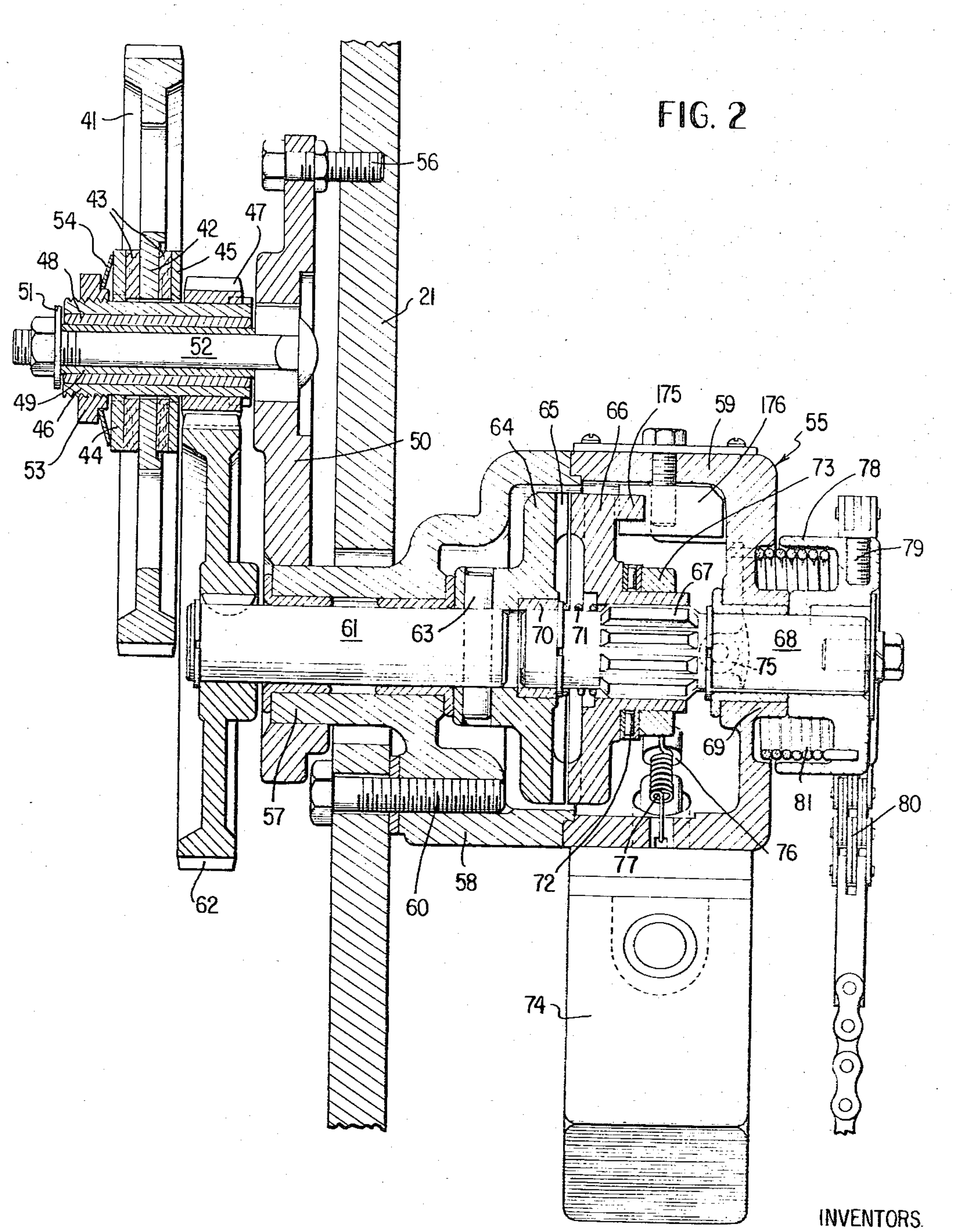
FIGURE 2 is a central vertical section on an enlarged scale through a ring rail lowering unit and an associated override clutch.

With reference to FIGURE 2, the intermediate gear 41 has a thin plate-like hub portion 42 having fibrous friction discs 43 secured to opposite faces thereof and adapted to turn therewith. Outwardly of the discs 43, metal pressure plates 44 and 45 are keyed to a splined hub 46 which also has a small reduction gear 47 keyed thereto for rotation therewith. The splined hub 46 has an internal bushing 48 fixedly secured therein and rotatable upon a fixed sleeve 49 having its ends securely clamped between a mounting arm 50 and a flat washer 51, the latter being carried by a supporting bolt 52 rigidly connected with the arm 50, as indicated in FIGURE 2. The splined hub 46 carries an adjusting nut 53 for a Belleville-type washer 54 utilized to regulate the pressure of the pressure plates 44 and 45 on the friction discs 43. It should be understood that the gear 41 and discs 43 subject to friction control may turn relative to the bushing 46, whereas the pressure plates 44 and 45 are positively keyed to the hub 46 and can only turn therewith. Consequently, under some load conditions transmitted back through the gear 47 to the splined hub 46 and gear 41, the latter can slip relative to the splined hub, gear 47 and associated parts thus forming an override or overload clutch device in association with the ring rail lowering unit 55 shown in FIGURES 1 and 2 and to be further described in detail.

The nature of the ring rail lowering unit 55 and associated override clutch described above in connection with FIGURE 2, is fully described in application Ser. No. 549,239, filed concurrently herewith for Ring Rail Lowering Mechanism Having Overload Slip Clutch, Coy V. Jones, Sr., and Walter Engels, inventors.

The mounting arm 50 is rigidly secured by a screw 56 near its upper end to the adjacent head end 21 of the spinning frame. As fully disclosed in said application, the lower end of the arm 50 is securely clamped to a hub extension 57 of a clutch housing section 58, in turn rigidly assembled with a companion clutch housing section 59, thus completing the housing of the unit 55. The housing section 58 is also rigidly connected with the spinning frame head end 21 by screw-threaded means 60.

The housing section 58 of unit 55 supports rotatably an input shaft 61 having a drive gear 62 keyed thereon and in continuous mesh with the small reduction gear 47. A roll pin 63 serves to connect the shaft 61 with a first clutch head 64 having tapered clutch teeth 65 opposing like teeth on a companion clutch head 66, slidably mounted upon a splined section 67 of an output shaft 68 of ring rail lowering unit 55. The output shaft 68 is journaled for rotation within a hub portion 69 of housing section 59, and the inner end of output shaft 68 is further supported within a bushing 70 contained within a recess of clutch head 64. The clutch head 66 turns with the output shaft 68 but is slidable axially thereon and is normally held out of coupling engagement with the clutch head 64 by an intermediate spring 71.

The shiftable clutch head 66 is backed up by a thrust bearing 72 and is actuated by a rotary and axially shiftable cam 73, whose movement is controlled by a solenoid 74 and stationary reaction rollers 75, all fully described in said application filed concurrently herewith. The cam 73 has an abutment part 76 which is engaged by a plunger element thrust forwardly by the solenoid 74. A return spring 77 is connected with the cam 73 to return it to its inactive position, thus allowing separaton or uncoupling of the two clutch heads 64 and 66.

Keyed upon the output shaft 68 is a pulley 78 having an anchor screw 79 for a ring rail wind-down chain 80 adapted to be wound up on and unwound from the pulley 78. A torsion spring 81 connected with the pulley 78 assures that there is no slack in the chain 80 during vertical oscillation of the ring rail.

As shown in FIGURE 1, the chain 80 is directed around the guide sheave 82 supported on the head end 21 by an arm 83, and the chain extends in a horizontal direction toward the first sector 35 and is adjustably connected therewith at 83'. An extension chain 84 or the like interconnects the sector 35 with the next sector 36 of the spinning frame, and a similar connection is provided between each adjacent pair of sectors so that they may all be turned in unison with their rocker shafts 33, 34, etc. under influence of the wind-down chain 80. It should be understood that when the chain 80 is wound up by the unit 55 on the pulley 78, it overcomes the effect of the counterweight means 37 tending to elevate the ring rail 26 and swings the arms 31, 32, etc. in the direction to lower the rods 29 and ring rail 26. When the chain 80 is unwound from the pulley 78, the counterweight means 37 turns the arms 31, 32, etc. in the direction for elevating the rods 29 and ring rail 26.

In conjunction with the ring rail lowering unit 55 and associated override clutch shown in FIGURE 2, there is provided on the builder motion 27 of the spinning frame an automation unit 85, FIGURES 1 and 3–5, for automatically rewinding the builder chain 86 when the ring rail 26 is automatically lowered to the bobbing doffing position. Ordinarily, the chain 86 must be manually rewound at this time by means of a crank which fits into a wrench socket opening in the ratchet gear 87 of builder motion 27.

Figures 3, 4, 5:
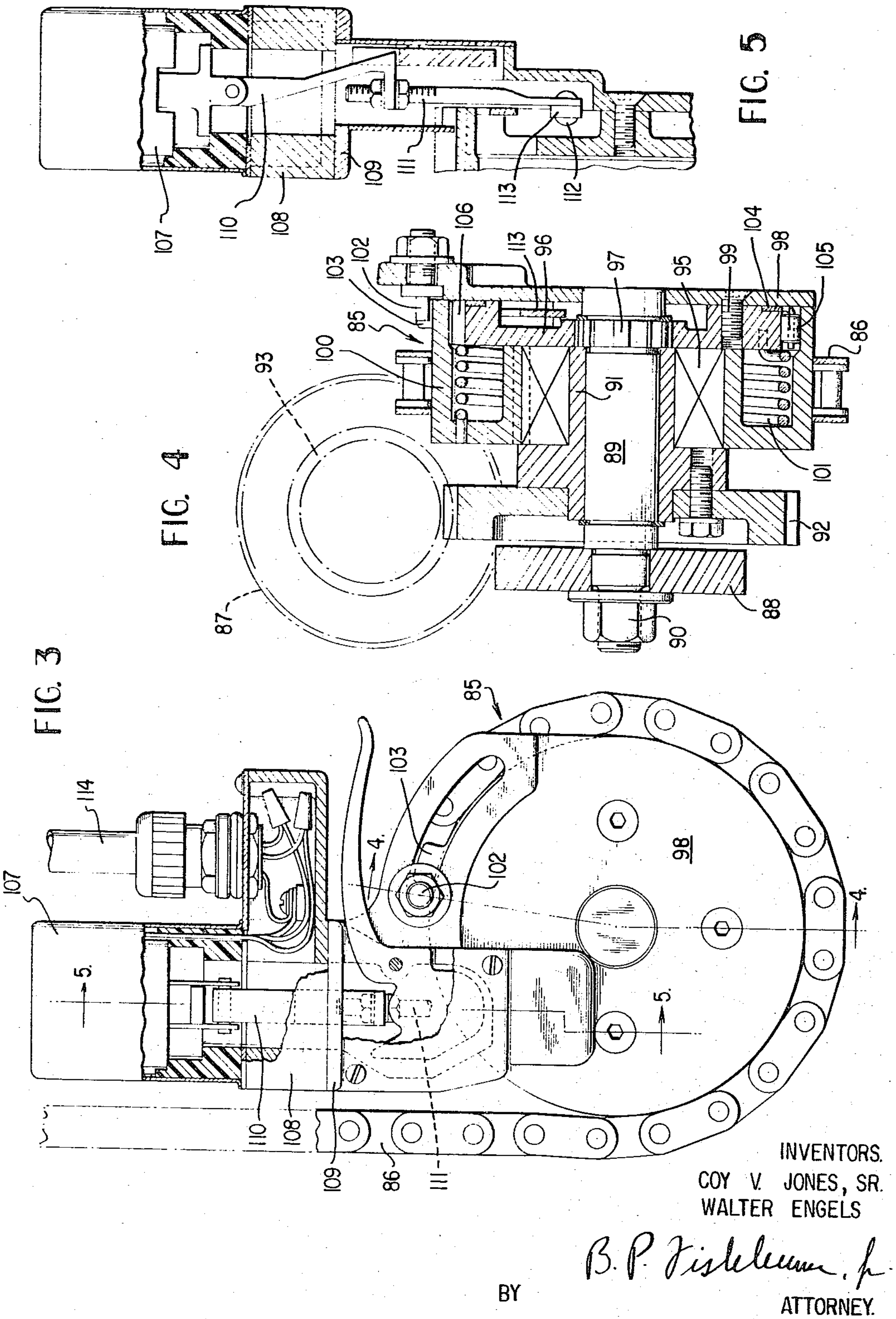
FIGURE 3 is an enlarged side elevation of a builder chain rewind unit, partly in section, taken on line 3—3 of FIGURE 1.
FIGURE 4 is a vertical section taken on line 4—4 of FIGURE 3.
FIGURE 5 is a vertical section taken on line 5—5 of FIGURE 3.

The builder chain rewinding unit 85 is fully disclosed in prior copending application S.N. 372,972, filed June 5, 1964, for Apparatus for Rewinding Builder Chain of Spinning Machine, Otto E. A. Edler et al. With particular reference to FIGURES 3 through 5, the builder chain rewind unit 85 is bodily supported on a portion 88 of the builder arm 28 through a fixed shaft 89 which is securely clamped thereto by screw-threaded means 90. A sleeve 91 is rotatably mounted upon the fixed shaft 89 and has a worm gear 92 rigidly secured thereto, driven by a worm 93 located inside of the builder motion housing 94 shown in FIGURE 1. This housing has been omitted in FIGURE 4 for clarity.

Mounted upon the sleeve 91 is a one-way active cam clutch 95 as described in application S.N. 372,972, and outwardly of this clutch is a race plate 96 of a coacting one-way active brake device. The race plate 96 is splined to the shaft 89 in the manner indicated at 97 in FIGURE 4. An end cover plate 98 is rigidly secured at 99 to the race plate 96.

Surrounding and mounted upon the one-way active cam clutch 95 is a builder chain winding and unwinding pulley 100, and one end of the builder chain 86 is securely anchored to the periphery of this pulley by an anchor screw similar to the chain anchoring screw 79 in FIGURE 2. The pulley 100 is biased to automatically wind up the builder chain 86 at the proper time by a torsion spring 101 having one end anchored to the pulley and its other end anchored to the relatively stationary race plate 96. An adjustable stop element 102 is provided upon the cover plate 98 for coaction with a stop lug 103 projecting radially from the pulley 100.

The above-mentioned one-way active brake device also includes a roller cage 104 for rollers 105 which are adapted to have wedging action with tangential flat faces on the race plate 96, between the faces and the interior cylindrical pulley face 106. This construction is fully described in application S.N. 372,972.

The builder chain rewinding unit 85 further embodies a solenoid 107 of the pull type, mounted upon a junction box 108, in turn mounted upon a flange 109 forming a part of the cover plate 98. The armature of solenoid 107 is connected by a link 110 with an adjustable lower link 111, having a pivotal connection at 112 with a brake release lever 113, as described in said application S.N. 372,972. The terminals of solenoid 107 are suitably connected within the junction box 108 with the three wires of a control cable 114, to be further described in connection with the overall control circuit in FIGURES 8 and 9.

When the builder motion 27 is in normal operation to oscillate and gradually elevate the ring rail 26, the builder chain 86 must unwind from the pulley 100 in order to allow the counterweighted arms 32, etc. to raise the ring rail. At this time, the builder motion worm 93 is driving the worm gear 92 and sleeve 91 in the proper direction for unwinding chain 86 from pulley 100 to elevate the ring rail. In such unwinding direction, the cam clutch 95 is active and the pulley 100 is positively driven through the clutch. However, the clutch 95 is inactive or free-wheeling in the reverse direction for rewinding the chain 86 on the pulley 100 by the force of spring 101. Simultaneously, however, the one-way active brake including race plate 96, cage 104 and rollers 105, is active to prevent reverse rotation of the pulley 100 under influence of the spring 101, and consequently, the builder chain may continue to unwind from the pulley until such time as the solenoid 107 dictates the release of the brake device by pulling on the release lever 113. Only at this time will the one-way active brake release in the unit 85 and allow the spring 101 to rewind the builder chain 86 on the pulley 100 until the stop lug 103 contacts the fixed stop 102. This mode of operation is fully described in said application S.N. 372,972. It might also be said that during the above operation for gradually elevating the ring rail, the ring rail lowering unit 55 has its internal toothed clutch disengaged or inactive so that the pulley 78 may simply oscillate freely.

The spinning frame automation system additionally embodies a tip bunch building escapement unit 115, FIGURE 1, connected directly and bodily in the horizontal portion of builder chain 86. This unit, its purpose, and mode of operation, is fully disclosed in United States Patent 3,059,407 to Kennedy et al. and it is also shown substantially in Patent 3,124,925, above-mentioned. Therefore it should be unnecessary to describe the escapement unit 115 in detail. It is equipped with an operating solenoid 116 to be further described in connection with the main control circuit. The purpose of the unit 115 is to effect a sudden small increase in the length of builder chain 86, after a time delay, following completion of the building of the bobbins. At such time, the escapement unit 115 is actuated to lengthen the chain 86 slightly and allow the ring rail 26 to shift up quickly from the largest practical bobbin diameter under the influence of the counterweights 37 or comparable spring means. FIGURE 1 shows the ring rail elevated to the tip bunch applying position in broken lines. It also shows the ring rail in the fully lowered or doffing position in broken lines. The full line position of the ring rail in FIGURE 1 represents the condition where the bobbins are completed and the ring rail is preferably in the upstroke position close to the lower dead point of the builder stroke. The speed at which the ring rail 26 is allowed to shift upwardly to the tip bunch position is accurately regulated by a checking unit 117, FIGURES 1 and 7, now to be described.

The unit 117 is a self-contained hydraulic checking device for the ring rail which facilitates controlling the manner in which the ring rail moves upwardly any time it is released by the ring rail lowering unit 55 or by the escapement unit 115. The necessity for the unit 117 will become more apparent during the description of the overall operation of the system to follow.

The unit 117 comprises a cylinder 118, closed and sealed at both ends. A sealed piston 119 moves back and forth inside of the cylinder 118. A piston rod 120 is attached to one side of the piston and protrudes through a sealed bore in the forward end of the cylinder. The checking unit 117 is suspended from an extension 121 of the first ring rail lifter arm 31 and the piston rod 120 is pivoted at 122 to this extension. The rear end of cylinder 118 is pivoted at 123 to a fixed frame member of the spinning frame. When the ring rail 26 is moving upwardly and the lifter arms 31, 32, etc. are turning on rocker shafts 33, 34, etc., the pivots 122 and 123 move apart.

A small hydraulic fluid reservoir 124 is mounted at the rear or base end of cylinder 118 on one side of piston 119 and the reservoir and cylinder are filled with hydraulic fluid, although not totally, to allow for the volume differential on opposite sides of the piston due to the fact that the piston rod 120 is present on one side of the piston and absent on the other side. The interior of reservoir 124 directly communicates with the interior of cylinder 118 on the base side of piston 119. The interior of the reservoir 124 is also connected to the interior of the cylinder on the rod side of piston 119 through a combination check valve and adjustable flow control valve shown diagrammatically at 125, connected in a line 126. The one-way check passage 127 and the opposite way flow control passage 128 of valve 125 are so arranged that the fluid displaced on the rod side of piston 119 flows through the flow control passage when the checking unit 117 is expanded, that is, when the ring rail 26 moves upwardly. When fluid is displaced on the base side of piston 119 in cylinder 118, such fluid flows through the one-way check passage 127, as when the checking unit 117 is retracted due to the ring rail 26 moving downwardly. When the unit 117 expands, no fluid can flow through the one-way check valve passage 127 because the check valve therein closes.

Figure 7:
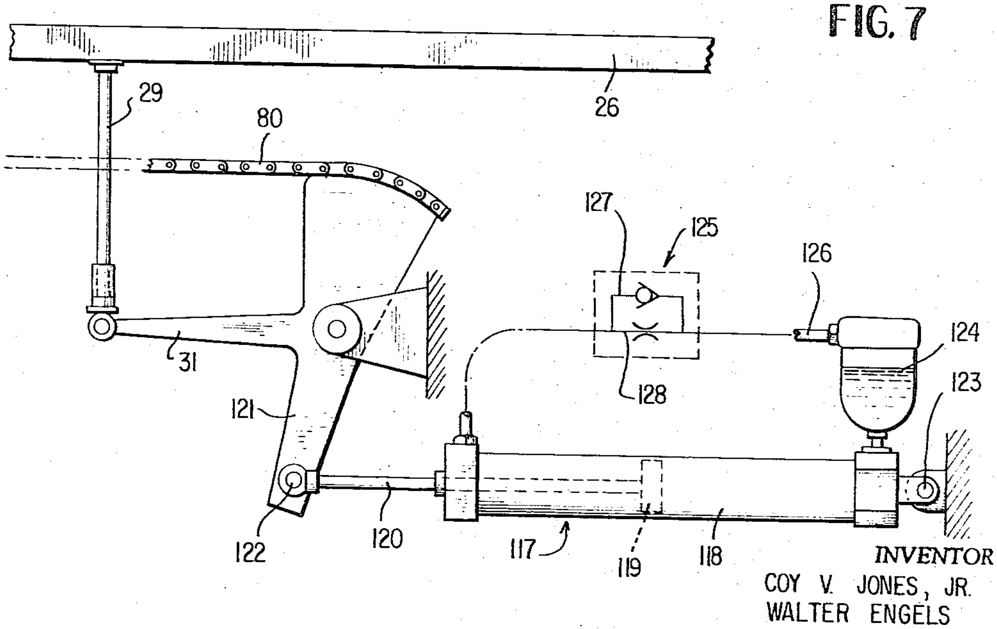
FIGURE 7 is an enlarged partly diagrammatic side elevation of a ring rail checking device.

This arrangement, FIGURE 7, allows the piston 119 to move without restriction in the cylinder 118 when the checking unit is retracted, that is, when the ring rail is under influence of a positive pull-down force from the unit 55. On the other hand, when the checking unit 117 is expanded and the ring rail 26 is rising under influence of counterweight means 37, the piston 119 is checked and controlled by the flow control passage 128. The flow control valve passage 128 is adjustable in a conventional manner and this renders the checking effect on the rising ring rail or its upward speed adjustment to the desired extent. Therefore, the unit 117 checks or controls the upward movement of the ring rail in an adjustable manner and allows the ring rail to be lowered freely and without checking effect.

Figure 6:
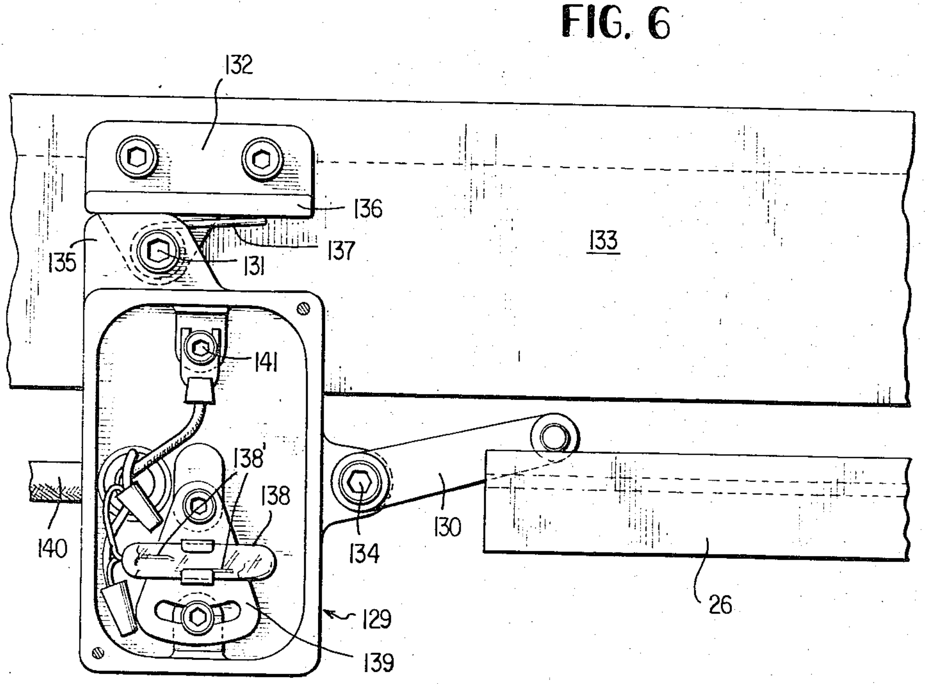
FIGURE 6 is an enlarged fragmentary side elevation of a ring rail limit switch and associated elements.

Generally as shown in Patent 3,124,925 and with reference to FIGURE 6 of this application, a ring rail limit switch 129 having an actuator arm 130 is directly in the path of one end of the ring rail 26 and is acted upon by the ring rail when the latter reaches the top of its travel subsequent to the completion of the yarn packages. As shown, the housing of limit switch 129 is pivoted at 131 to a fixed bracket 132 mounted upon a stationary frame member 133 of the spinning frame. The actuator arm 130 is adjustable on a pivot 134 and may be locked in the properly adjusted position. Swinging of the limit switch casing on pivot 131 in one direction is positively limited by a stop lug 135 on the top of the switch casing which abuts a level flange 136 of bracket 132 when the switch housing is vertical. Upon contact with the ring rail 26, the limit switch housing can swing in the other direction, or counterclockwise, FIGURE 6, and a yielding spring 137 on the pivot 131 resists this movement and tends to return the limit switch to the position shown in FIGURE 6. The housing of limit switch 129 contains a mercury switch element 138 held in an adjustable bracket 139 in the housing. The terminals of the switch element 138 are connected with wires leading to a three wire cable 140 which will be further discussed in connection with FIGURES 8 and 9. A grounding connection is shown at 141 in FIGURE 6.

As shown in FIGURE 1, an electrical control unit 142 is provided including a box or housing mounted on a suitable fixed support. The purpose of the control unit 142 is to coordinate the operation of the various automation components or units already described including the ring rail lowering unit 55, builder chain rewinding unit 85, tip bunch applying escapement unit 115, ring rail limit switch 129 and certain other existing components on the spinning frame including the spinning frame motor. The arrangement is such in connection with the control unit 42 that all automation components of the present invention are properly timed and cycled with the operation of the spinning frame so that the overall operation is automatic and results in the production of accurate and uniform bobbins with efficiency.

Within the housing of control unit 142, FIGURE 8, there is mounted a timer 143 comprising a small gear motor 144 driving a cam shaft 145 upon which six adjustable cams 146, 147, 148, 149, 150 and 151 are mounted. The shaft 145 is adapted to turn one revolution in three minutes. Each cam 146–151 consists of a pair of circular discs which can be adjusted circumferentially relative to each other so that a recess in the circumference of the cams can be made circumferentially longer or shorter. This feature is clearly shown in diagrammatic FIGURE 10. The position of each composite cam 146–151 relative to the other cams can also be adjusted on the axis of shaft 145.

The timer 143 further comprises six switches 152, 153, 154, 155, 156 and 157 mounted with their actuators engaging the several timer cams to be operated thereby. As shown in FIGURE 8, each switch 152–157 has two sets of contacts, a set of normally closed contacts and a set of normally open contacts. Both sets have one common connector, as shown. The normally closed (NC) contacts are closed when the cam follower elements 158 of the switch actuators drop into the recesses in the cam peripheries, FIGURE 10. The normally open (NO) contacts of the six switches are open when the elements 158 drop into the recesses of the cams. During the automatic cycle of operation and also when the timer is at rest, the NO contacts are held closed and the NC contacts are held open by the unrecessed peripheries of the circular cams 146–151. As shown in FIGURE 8, switches 156 and 157 have both sets of their contacts wired.

One complete cycle of the timer 143 is divided into two portions. The first cycle portion governs the automatic control functions before doffing, while the second cycle portion governs the automatic control functions after doffing.

Specifically, switch 157 and cam 151 control the power supply for the timer motor 144 before doffing. Switch 156 and cam 150 control the power supply for the timer motor after doffing, cofunctioning with a relay switch 159, FIGURE 8. Switch 155 and cam 149 control the power supply for the solenoid 116 on the tip bunch building escapement unit 115. Switch 154 and cam 148 control the power supply for the engaging solenoid 74 on the ring rail lowering unit 55 in both cycle portions. Switch 153 and cam 147 control the power supply for the coil in the main motor starter 160 shown in FIGURE 9, before doffing. Switch 152 and cam 146 control the power supply for the coil in the main motor starter 160, after doffing. The spinning frame main motor is indicated at 161 in FIGURE 9.

As described, FIGURES 8 and 9 constitute a complete circuit. The portions of the circuit in FIGURE 8 are those portions associated with the control unit 142 and the various automation components or units of the invention. FIGURE 9 contains for the sake of completeness the interconnected circuits of the spinning frame proper and these are conventional elements.

The relay 159 prevents the disturbance of the second portion of the automatic control cycle (after doffing) in case the automatic start-up button 162 is pressed accidentally.

A door safety switch 163 interrupts the 110 volt power supply for the panel if the door on the electrical control unit 142 should be left open.

A fuse block 164 is provided, as in FIGURE 8, to protect the electrical control unit against electrical short-circuiting. A terminal strip 165 is utilized in the control unit 142 to facilitate wiring.

Referring to both FIGURES 8 and 9 as a unit, the electrical control unit 142 receives its hot power line from terminal 1 on terminal strip 166 over the following path: terminal 1 to NC spinning frame stop switch 167 to NC spinning frame head end door safety switch 168 to NC stop button 169 to terminal 14 of strip 165 to common connection of door safety switch 163 to NO but held closed contact 170 of door safety switch to terminal 1 of terminal strip 165.

The electrical control unit 142 receives its grounded power line from terminal 2 on terminal strip 166 over the path: terminal 2 to terminal 15 on strip 165 to the common of door safety switch 163 to NO but held closed contact 171 of door safety switch 163 to terminal 2 of strip 165. Terminal 2 of strip 165 is interconnected and grounded with terminals 6, 7, 11 and 16 on strip 165, as shown. One side of fuse block 164 is connected to terminal 1 of strip 165.

The sensing circuit for ring rail limit switch 129 and also the start-up circuit for timer motor 144 comes from the fuse block 164 and goes to the terminal 16 of strip 165 over the following path: from fuse to terminal 3 of strip 165 to NO contact of ring rail limited switch 129 to terminal 4 of strip 165 to NC contact of switch 157 to common of switch 157 to timer motor 144 to terminal 16 of strip 165.

The holding circuit for the timer motor 144 during the first portion of the timer cycle comes from the fuse block 164 and goes to terminal 16 of strip 165 over the following path: from fuse block to NO contact of switch 157 to common contact of switch 157 to winding of timer motor 144 to terminal 16 of strip 165.

The actuation circuit for tip bunch building escapement unit 115 comes from the fuse block 164 over the interconnected commons of the six timer switches and to terminal 6 of strip 165 over the following path: from fuse block 164 to NO contact of timer switch 157 to common contact of switch 155 to NC contact of switch 155 to terminal 5 of strip 165 to solenoid 116 of escapement unit 115 to terminal 6 of strip 165.

The actuation circuit for the ring rail lowering unit 55 comes from the fuse block over the interconnected commons of the timer switches and goes to terminal 7 of strip 165 over the following path: from fuse block to NO contact of switch 157 to common contact of switch 154 to NO contact of switch 154 to terminal 8 of strip 165 to engagement solenoid 74 of ring rail lowering unit 55 to terminal 7 of strip 165.

The actuation circuit for the builder chain rewind unit 85 comes from the NC contact of the stop button 169 on the head end 21 of the spinning frame and goes to terminal 11 of strip 165 over the following path: NC contact of stop button 169 to NO contacts of automatic start-up button 162 to terminal 13 of strip 165 to terminal 9 of such strip to solenoid 107 of rewind unit 85 to terminal 11 of strip 165.

The holding circuit for the starter coil 161′ of the main motor 161 comes from the fuse 164 over the interconnected commons of timer switches 152–157 and goes to terminal 2 of terminal strip 166 over the following path: from fuse 164 to NO contact of timer switch 157 to common contact of switch 153 to NC contact of switch 153 to terminal 10 of strip 165 to NC contact of start button 162 on head end 21 of spinning frame to self-holding contacts 172′ of starter 160 for main motor 161 to starter coil 161′ and contacts 172 of overload relays to terminal 2 on strip 166.

The start-up circuit for the starter coil of the main motor 161 comes from the fuse 164 over the interconnected commons of timer switches and goes to terminal 2 of strip 166 on the following path: from fuse to NO contact of switch 157 to common contact of switch 152 to NC contact of switch 152 to terminal 12 of strip 165 to NO contact of start button 162 on head end of frame to starter coil 161′ of starter 160 to contacts of overload relays 172 to terminal 2 on terminal strip 166.

The start-up circuit for the second portion of the automatic control cycle comes from the NC contacts of the stop button 169 on the head end of the frame and goes to terminal 2 of strip 165 over the following path: NC contact of stop button 169 to NO contacts 173 of automatic start-up button 162 to terminal 13 of strip 165 to terminal 9 of this strip to the coil 174 of relay switch 159 to terminal 2 of strip 165.

The holding circuit for the relay switch 159 comes from the fuse 164 over the interconnected commons of the timer switches and goes to terminal 2 of strip 165 over the following path: fuse 164 to NO contact of switch 157 to common contact of switch 156 to NO contact of switch 156 to common contact of relay switch 159 to NO contact of relay switch to coil 174 of relay switch to terminal 2 of strip 165.

The start-up circuit for the timer motor 144 for the second portion of the automatic cycle comes from the fuse 164 and goes to terminal 16 of strip 165 over the following path: from the fuse to the common contact of relay switch 159 to NO contact of relay switch to the common contact of switch 157 to the winding of timer motor 144 to terminal 16 of strip 165.

The holding circuit for the timer motor 144 during the second portion of the automatic cycle comes from the fuse over the interconnected commons of the timer switches and goes to terminal 16 of strip 165 on the following path: fuse 164 to NO contact of switch 157 to common contact of switch 156 to NC contact of switch 156 to NO contact of relay switch to common contact of switch 157 to timer motor 144 to terminal 16 of strip 165.

The sequential functions of the individual timer switches actuated by the adjacent cams 146–151 will be described in conjunction with the description of the overall operation of the automation system.

OPERATION

The functions of the automatic control system during a complete cycle of operation of the spinning frame are as follows:

After completion of the building of the warp or filling bobbins 24 by oscillation and gradual rising of the ring rail to the full line position shown in FIGURE 1, the ring rail engages the actuator arm 130 of ring rail limit switch 129 and the latter tilts upon the pivot element 131 causing the mercury in switch element 138 to bridge the contacts 138′, as illustrated in FIGURE 6. This completes the sensing circuit and start-up circuit for timer motor 144 over the following path: fuse 164 to terminal 3 of strip 165 to NO but now closed contacts of ring rail limit switch 129 to terminal 4 of strip 165 to NC now closed contact of switch 157 to the winding of timer motor 144 to terminal 16 of strip 165.

The timer motor is energized and drives the cam shaft 145 with its six cams 146–151. The cam 151 first closes the holding circuit for the timer motor over the following path: fuse 164 to NO but now closed contact of switch 157 to common contact of switch 157 to the timer motor winding to terminal 16 of strip 165.

Simultaneously, cam 151 also opens the start-up circuit for the timer motor 144, so that the ring rail limit switch 129 is not energized during the tip bunch building period and the first portion of the automatic control cycle. After a certain time delay from the actuation of the ring rail limit switch 129, cam 149 closes the actuation circuit for the tip bunch building escapement unit 115 over the following path: fuse 164 to NO contact of switch 157 to common contact of switch 155 to NC and now closed contact of switch 155 to terminal 5 of strip 165 to the coil of escapement unit of solenoid 116 to terminal 6 of strip 165.

When the solenoid 116 is energized, the locking plunger in the escapement unit is retracted and the axial pin is extended from the casing to cause a sudden lengthening of builder chain 86 thereby enabling the counterweight means 37 or springs to raise the ring rail 26 to the tip bunch applying position shown in broken lines in FIGURE 1 adjacent the upper tips of the bobbins. The mode of operation of the unit 115 is fully disclosed in Patent 3,059,407 and also in Patent 3,124,925. When the counterweight means elevates the ring rail into the tip bunch applying position, the speed of the upward movement of the ring rail is checked and controlled by the self-contained hydraulic checking unit 117, FIGURE 7, whose operation has already been described. As explained, the unit 117 allows the ring rail 26 to move downwardly in a free or unchecked manner, while the upward travel of the ring rail is controlled and may be adjusted.

The mentioned time delay between the actuation of the ring rail limit switch 129 and the actuation of the escapement unit 115 is an important feature of the improved control system. This time delay allows the ring rail to move downwardly once more and then upwardly a short distance of approximately ⅜ inch to ⅝ inch, so that the ring rail moves into the tip bunch position from the largest possible package diameter on the bobbin. This eliminates excessive strain in the yarn end of the tip bunch between the tip bunch and package, when the tip bunch is removed in later operations. The delay time is adjustable by changing the angular position of cam 149 relative to cam 151. This adjustment may be required to accommodate various builder stroke lengths, as will be understood by those skilled in the art.

The ring rail 26 remains in the tip bunch position for a certain time period to wind an approximately predetermined number of yarn wraps into each tip bunch before the ring rail 26 is lowered. The time period needed to apply the tip bunch is adjustable and determined by the angular position of cam 148 relative to cam 149 on the cam shaft 145.

When cam 148 actuates switch 154, the circuit for the engaging solenoid 74 of ring rail lowering unit 55 is closed over the following path: fuse 164 to NO contact of switch 157 to common contact of switch 154 to NO but now closed contact of switch 154 to terminal 8 of strip 165 to coil of engagement solenoid 74 to terminal 7 of strip 165.

The solenoid 74 causes engagement or coupling of clutch heads 64 and 66 and lowers the ring rail 26 by winding up the chain 80 until a stop lug 175 on the driven clutch head 66 engages a fixed stop 176 in housing section 59, see FIGURE 2. Upon engagement of these stop elements 175 and 176 in the unit 55, the override clutch structure associated with large intermediate gear 41 slips, holding the stop elements 175 and 176 securely in contact and maintaining the ring rail 26 in its lowest position, even after the spinning frame is stopped, until the engaging solenoid 74 is de-energized at a time to be discussed hereinafter. That is to say, the slipping override clutch arrangement permits the gear 41 to turn relative to the splined hub 46 while there is sufficient friction and driving effect through the gears 47 and 62 and the clutch heads 64 and 66 to firmly hold the elements 175 and 176 in contact and to hold the ring rail in the lowest position. The slipping clutch also provides a friction brake means for the spindle drive system of the spinning frame after the spinning frame main motor 161 is de-energized, and when the fixed stop 176 is engaged by lug 175. The main motor 161 may be de-energized at an early enough time to enable the slipping clutch, now serving as a brake, to stop the spindle drive system when the ring rail is in the down position. This allows the number of waste yarn wraps on the bottoms of the spindles to be held to a minimum.

It should be mentioned here that cam 148 has two peripheral recesses shown at *a* and *b* in FIGURE 10, separated by a short cam portion *c*. This facilitates the short pull-down motion to remove any kinks from the yarn, as will be further described.

After the ring rail lowering operation caused by the unit 55 is completed, cam 147 on the still-turning timer cam shaft 145 opens the contacts of switch 153 breaking the holding circuit for the starter coil of the main spinning frame motor 161 over the following path: fuse 164 to NO contact of switch 157 to common contact of switch 153 to NC but now open contact of switch 153 to terminal 10 of strip 165 to NC contact of start button on head end 21 of spinning frame to self-holding contacts of starter coil to starter coil to contacts of overload relay 172 to terminal 2 on strip 166. The main motor relay switch breaks the 3-phase high voltage circuit to the main motor 161.

It should be mentioned that the angular position of cam 147 is adjustable relative to cam 148. This renders adjustable the time point at which the main motor 161 is de-energized, independently from the time point at which the ring rail is lowered to accommodate variations in the coasting time of various spinning frame types to hold the number of waste yarn wraps on the spindle or bobbin butt to a minimum.

After the spinning frame has stopped, cam 151 breaks the holding circuit of the timer motor 144 by allowing the cam follower of switch 157 to drop into the cam recess, opening the NO contact of switch 157. The holding circuit for the timer motor 144 has been described above. The timer motor is now stopped and the first portion of the total automatic cycle is completed.

With the timer shaft 145 stopped, the timer switches are in the following condition: on switch 157 the NO contacts are open and the NC contacts are closed; on switch 156 the NO contacts are closed and the NC contacts are open; on switch 155 the NC contacts are held open; on switch 154 the NO contacts are closed, holding the ring rail lowering unit 55 active or engaged; on switch 153 the NC contacts are held open and on switch 152 the NC contacts are held open.

The spinning frame is now ready for doffing. After the doffing of the filled bobbins and the placement of new empty bobbins on the spindles 22, the operator presses the automatic start and reset button 162. When this button is pressed, two circuits are closed. One circuit is the actuation circuit for the builder chain rewind unit 85. The other is the start-up circuit for the second portion of the automatic control cycle. The actuation circuit for the rewind unit 85 has the following path: NC contact 169 of the stop button on the head end of the spinning frame to NO but now closed contacts 173 of automatic start-up button 162 to terminal 13 of strip 165 to terminal 9 of such strip to solenoid 107 of chain rewind unit 85 to terminal 11 of strip 165.

The start-up circuit for the second portion of the automatic control cycle has the following path: NC contact 169 of the stop button on the head end of the spinning frame to NO but now closed contacts 173 to terminal 13 of strip 165 to terminal 9 of such strip to coil 174 of relay switch 159 to terminal 2 of strip 165.

The relay switch 159 is actuated now and closes two circuits. One circuit is its own holding circuit. The other circuit is the start-up circuit for timer motor 144 for the second automatic cycle portion. The holding circuit for the relay coil 174 has the following path: fuse 164 to NO contact of switch 157 to common of switch 156 to NO but now closed contacts of switch 156 to common contact of relay switch 159 to NO but now closed contact of the relay switch to the coil 174 of the relay switch to terminal 2 of strip 165.

The start-up circuit for the timer motor 144 for the second portion of the automatic cycle has the following path: fuse 164 to common contact of relay switch 159 to NO but now closed contact of the relay switch to common contact of switch 157 to the winding of timer motor 144 to terminal 16 on strip 165.

The actuation circuit for the chain rewind unit 85 actuates the solenoid 107 of this unit which releases the one-way active roller brake allowing the spring-loaded pulley 100 to rewind the builder chain 86 thereon. This mode of operation is more fully described in application Ser. No. 372,972, abovementioned.

The start-up circuit for timer motor 144 starts the timer motor for the second portion of the automatic cycle. The cam shaft 145 begins to turn. Immediately thereafter, cam 150 allows the cam follower of switch 156 to drop into its recess, opening the NO but held closed holding circuit for the relay coil 174, but at the same time closing the NC contacts of switch 156 thus continuing to supply the timer motor with power over the following path: fuse 164 to NO contact of switch 157 to common contact of switch 156 to NC and now closed contact of switch 156 to NO contact of relay switch 159 to common contact of switch 157 to winding of timer motor 144 to terminal 16 on strip 165. The relay switch 159 is now open again while timer motor 144 is still running. When automatic start-up switch 162 is again pressed, relay switch 159 will be actuated but does not hold.

Before the timer motor 144 is started for the second portion of the automatic cycle, cam 148 is holding closed the NO contacts of switch 154, keeping the ring rail lowering unit 55 engaged, maintaining the ring rail in its lowermost or doffing position. Shortly after the second portion of the automatic cycle is started, cam 148 allows the cam follower of switch 154 to drop into its peripheral recess, opening the NO but held closed contacts of switch 154. This breaks the actuation circuit for the engagement solenoid 74 of ring rail lowering unit 55 which was described before. The ring rail lowering unit disengages and releases the ring rail 26 into the start-up position. The upward movement of the ring rail under influence of counterweight means 37 or equivalent springs is regulated by the hydraulic checking unit 117 in the manner previously described.

FIGURE 1 shows the ring rail 26 in broken lines at approximately its lowermost or doffing position near the bottoms of the bobbins. Immediately after the ring rail has been released into the start-up position, the ring rail lowering unit 55 is engaged again. This is done by the short point *c*, FIGURE 10, of cam 148 mentioned previously in connection with the ring rail lowering operation. The point *c* of cam 148 closes the NO contacts of switch 154 which closes again the actuation circuit for ring rail lowering unit 55 for a very short time period only. It should be mentioned that all operations in the second portion of the automatic cycle (after doffing) have been carried out while the spinning frame is still stopped.

After the ring rail lowering unit 55 is re-engaged, cam 147 closes the NC but held open contacts of switch 153, closing the holding circuit for the starter coil, which is now still held open by the self-holding contacts of the main motor starter 160. After cam 147 and switch 153 have provided for the holding circuit for the starter, the turning cam 146 allows the cam follower of switch 152 to enter the recess in the periphery of cam 146, closing the NC but held open contacts of switch 152. This closes the start-up circuit for the main motor starter coil over the following path: fuse 164 to NO contact of switch 157 to common contact of switch 152 to NC and now closed contact of switch 152 to terminal 12 of strip 165 to NO contact of start button on head end of spinning frame to self-holding contact of main motor starter 160 to the starter coil of this starter to the two contacts 172 of the overload relay to terminal 2 on strip 166.

The 110-volt starter coil is now energized and actuates the 3-phase high voltage main motor switch. The spinning frame now starts to operate.

When the main motor switch is closed, the self-holding contacts 172' are also closed. This closes the holding circuit for the starter coil over the following path: fuse 164 to NO contact of switch 157 to common contact of switch 153 to NC and now closed contact of switch 153 to terminal 10 of strip 165 to NC contact of start button on head end of spinning frame, to now closed self-holding contacts of main motor starter to starter coil to contacts 172 of overload relays to terminal 2 on strip 166.

The turning cam 146 allows the NC contacts of switch 152 to close for a short time only. It has been mentioned that the ring rail lowering unit 55 was re-engaged immediately after the ring rail 26 was released into the start-up position with the spinning frame stopped. This re-engagement causes the ring rail to be pulled down simultaneously with the starting of the spinning frame. Any kink in the yarn is thus removed to avoid excessive stress on the yarn.

Shortly after the spinning frame has started, the turning cam 148 allows the cam follower of switch 154 to drop into its second recess *a*, FIGURE 10, opening the NO contacts of switch 154 and breaking the actuation circuit for the engagement solenoid 74 of unit 55. The circuit was described before. The ring rail lowering unit 55 disengages and releases the ring rail 26 after a short pull-down motion. A typical distance is one inch to one and one-half inches.

When the ring rail lowering unit releases the ring rail, its upward motion is controlled by the hydraulic checking unit 117, as described. The slow upward motion of the rail provides time for the travelers on the rings to accelerate until a steady differential between circumferential bobbin speed and traveler speed is established. This holds excessive yarn tension during start-up at a minimum, reducing breakage of yarn ends during start-up.

This concludes the operation of the automatic control system. However, the timer motor 144 is still turning the cam shaft 145 until cam 150 breaks the holding circuit for the timer motor by opening the NC contacts of switch 156. The circuit was described before. The total automatic cycle is now completed. The cam follower of switch 157 is in the recess of cam 151, immediately before the rise in its peripheral surface when this cam is stopped. This means that the NC contacts of switch 157 are closed, preconditioning the sensing circuit for the timer motor for a new automatic control cycle.

Reference is now made to a modification of the invention involving a modified electrical control circuit shown in FIGURES 11 and 12 and a modified timer cam diagram shown in FIGURE 13. The principal mechanical components of the spinning frame automation system remain unchanged including the previously-described overload clutch, ring rail lowering unit, builder chain rewinding unit and ring rail checking device. Consequently, the modified electrical circuit may be described and its operation understood in conjunction with the identical and previously fully described mechanical components and without the necessity for further mechanical drawings.

The present modification depicted by FIGURES 11 through 13 represents a substantial simplification of the previously-described circuit in FIGURES 8 and 9, as will be further discussed. In the present modification, the cycle timer is of the same type described in the previous embodiment but involves only four timer switches and cams instead of six in the previous embodiment. A notable difference in the modification is that the timer cycle is no longer interrupted but is continuous. A relay switch prevents starting-up of the spinning frame before the ring rail is released into a start position. The modified system provides a start and release push button and a start and shake push button, whose functions will be made clear during the description of the modified circuitry and modified operation.

Significantly, the modified system differs from the previous embodiment in the provision of remote push button shaking of the ring rail under control of an operator utilizing human judgment as distinguished from automatic ring rail shaking in the previous embodiment. In both cases, the purpose of shaking the ring rail by pulling it downwardly quickly a short distance is to remove possible kinks from the yarn. In the prior embodiment, the spinning frame main motor is energized automatically, whereas in the present modification the spinning frame is started by pressing the start-up button. Other differences in the two modifications will appear as the detailed description proceeds.

With continued reference to FIGURES 11 and 12, the modified electrical control unit receives its incoming power (hot) through a circuit breaker 200 in the incoming power line and from a transformer 201 over the following path: from transformer terminal 202 to fuse 203 to NO but now closed door safety switch 204 in head end, to common contact of control box safety switch 205 to NO but now closed contact of same to terminal 1 of terminal strip 206.

The electrical control unit receives its ground power from the other transformer terminal 207 over the path: from transformer terminal 207 to common contact of control box safety switch 205 to NO but now closed contact of same to terminal 2 of terminal strip 206. Terminal 2 of this strip is electrically interconnected with terminals 3, 8, 9, 10, 11, 12 and grounded as shown at 208 in FIGURE 11.

The sensing circuit for ring rail limit switch 209 and start-up circuit for timer motor 210 comes from terminal 1 of strip 206 and leads to terminal 2 of this strip over the following path: terminal 1 of strip 206 to NO contact 211 of start switch 212 to NC contact of stop switch 213 to common contact of timer switch 214 to NO contact of switch 214 to terminal 6 of strip 206 to NC contacts 215 of stop switch 216 on foot end of frame, to self-holding and now closed contact 217 of main motor starter 218 to terminal 7 of strip 206 to NO contact 219 of start switch 212 to common contact of ring rail limit switch 209 to NO and now closed contact of switch 209 to NC contact of timer switch 220 to common contact of this switch to winding 221 of timer motor 210 to terminal 2 of terminal strip 206.

The holding circuit for timer motor 210 during the first portion of the timer cycle originates at terminal 1 of terminal strip 206 and goes to terminal 2 thereof over the following path: terminal 1 to NO but now closed contact of timer switch 220 to common contact of timer switch 220 to winding 221 of timer motor to terminal 2 of terminal strip 206.

The actuation circuit for the escapement unit 115 comes from terminal 1 of terminal strip 206 and goes to terminal 12 of the same over the following path: terminal 1 of terminal strip 206 to NO contact of timer switch 220 to common contact of timer switch 222, FIGURE 11, to NC but now open contact of timer switch 222 to terminal 4 of terminal strip 206 to escapement unit solenoid 223 to terminal 12 of terminal strip 206.

The actuation circuit of the builder chain rewind unit 85 is almost the same as the circuit for the escapement unit and comes from terminal 1 of terminal strip 206 and goes to terminal 12 of the same over the following path: terminal 1 of terminal strip 206 to NO contact of timer switch 220 to common contact of switch 222 to terminal 4 of terminal strip 206 to chain rewind unit solenoid 224 to terminal 10 of strip 206.

The ring rail lowering unit 55 is actuated by the relay 225, FIGURE 11. The actuation circuit for the relay switch comes from terminal 1 of terminal strip 206 and goes to terminal 3 of the same over the following path: terminal 1 to NO contact of timer switch 220 to common contact of timer switch 226 to NC and now closed contact of switch 226 to coil 227 of relay switch 225 to NC contacts 228 of stop button 213 in control box to terminal 3 of terminal strip 206.

The holding circuit for relay switch 225 comes from terminal 1 of terminal strip 206 and goes to terminal 3 of the same over the following path: terminal 1 to NO contact 211 of start button 212 on control box to common contacts 229 of relay switch 225 to NO but now closed contact of relay switch 225 to coil 227 of relay switch to NC contacts 228 of stop button or switch 213 to terminal 3 of terminal strip 206.

The actuation circuit for the ring rail lowering unit 55 comes from terminal 1 of terminal strip 206 and goes to terminal 8 of the same over the following path: terminal 1 of terminal strip 206 to NO contact of start button 212 to common contacts 229 of relay switch 225 to NO but now closed contact of relay switch to terminal 5 of strip 206 to solenoid 230 of ring rail lowering unit 55, FIGURE 11, to terminal 8.

The holding circuit for the starter coil 231 of spinning frame main motor 232, FIGURE 12, comes from terminal 1 of terminal strip 206 and goes to the grounded transformer terminal 207 over the following path: terminal 1 to NO contact 211 of start switch 212 to NC contact 228 of stop switch 213 to common contact of timer switch 214 to NO contact of switch 214 to terminal 6 to NC contact 215 of stop switch 216 at foot end of frame to self-holding and now closed contact 217 of main motor starter 218 to coil 231 to contacts of overload relays 233 and 234 to grounded transformer terminal 207.

There are two start-up circuits for the main motor starter 217; one from the foot end of the frame which starts only the main motor 232, and one from the head end which also allows shaking of the ring rail 26 under control of an operator.

The foot end start-up circuit comes from terminal 1 of terminal strip 206 and goes to the grounded transformer terminal 207 over the following path: terminal 1 to NO contacts 211 of start switch 212 on head end to NC contacts 228 of stop switch 213 to common contact of timer switch 214 to NO contact of switch 214 to terminal 6 to NC contact 215 of stop switch 216 on foot end to NO but momentarily closed contacts 235 of start switch 236 on foot end to NO contact of self-holding contacts 217 to holding coil 231 to contacts of overload relays 233 and 234 to grounded transformer terminal 207.

The "shake" start-up circuit also comes from terminal 1 and also goes to the grounded transformer terminal 207 but over a different path, as follows: terminal 1 to NO contacts 211 of start switch 212 on head end, to common contacts 229 of relay switch 225 to NC contact of relay switch to NO contacts 219 on shake start-up switch 212 to terminal 7 to NO contact of self-holding contacts 217 to holding coil 231 to contacts 233 of overload relays to grounded transformer terminal 207.

The ring rail "shake" circuit comes from terminal 1 and goes to terminal 8 over the following path: terminal 1 to NO but momentarily closed contacts 211 of start switch 212 to NO contact of relay switch 225 to terminal 5 to solenoid 230 of ring rail lowering unit to terminal 8 of terminal strip 206.

OPERATION

The mode of operation of the modified control system particularly in FIGURES 11 and 12 during a complete cycle of operation is as follows:

After completion of the building of warp or filling bobbins, the ring rail 26 engages the roller head 237, FIGURE 11, of ring rail limit switch 209 and closes its contacts. This completes the sensing circuit and start-up circuit for the timer motor 210 over the following path: terminal 1 of terminal strip 206 to NO contact 211 of start switch 212 to NC contacts of stop switch 213 to common contact of timer switch 214 (cam follower 238 is in cam recess) to terminal 6, to NC contacts 215 of stop switch 216 on foot end of frame, to self-holding and now closed contact 217 of main motor starter 218 to terminal 7 to NO contact 219 of start switch 212 to common contact of ring rail limit switch 209 to NO contact (now closed) of ring rail limit switch 209 to NC contact of timer switch 220 to winding 221 of timer motor 210 to terminal 2 of strip 206.

The reasons for this particular circuit path are the following: To prevent the ring rail limit switch 209 from energizing the timer motor (accidentally during cleaning) when spinning frame is not operating; to cause functioning of timer switch 214 to stop the main motor 232; to connect terminal 7 and outside contact 219 of head end start button 212 to utilize the path from outside contact 219 to terminal 7 to outside contact of holding contacts 217 to holding coil 231 to overload contacts 233 and 234 to grounded transformer terminal 207.

For the second period start-up also, the timer motor 210 is energized and drives cam shaft 239 with its four timing cams 240, 241, 242 and 243. The first cam 240 closes the holding circuit for the timer motor over the following path: terminal 1 to NO but now closed contacts of timer switch 220 to common contact of switch 220 to winding 221 of timer motor to terminal 2 of strip 206.

At the same time, cam 240 also opens the start-up circuit for the timer motor 210 so that the ring rail limit switch 209 is not energized during the tip bunch building period and the remainder of the automatic control cycle.

The cam follower 244 is now on the outside of the cam. After a certain time delay, to be discussed later, following actuation of the ring rail limit switch 209, cam 241 closes the actuation circuit for the tip bunch building escapement unit 115 over the following path: terminal 1 to NO contact of timer switch 220 to common contact of switch 222 to NC and now closed contact of switch 222 to terminal 4 to coil of escapement unit solenoid 223 to terminal 12 of strip 206.

When the solenoid 223 is energized, the locking plunger in the escapement unit 115 is retracted and the axial pin, yielding to the load, is extended from the casing to effect lengthening of the chain, thereby enabling the counterweights or springs on the spinning frame to eleveate the ring rail 26 to the tip bunch applying position. When the ring rail rises to the tip bunch applying zone, its upward speed is checked by the hydraulic checking unit 117, as previously described.

The mentioned time delay between actuation of the ring rail limit switch 209 and actuation of the escapement unit 115 is an important feature of the present embodiment of the invention. This time delay permits the ring rail to travel downwardly once more and then upwardly a short distance of approximately ⅜ inch to ⅝ inch, so that the ring rail moves into the tip bunch position from the largest possible package diameter on the bobbin. This eliminates excessive strain on the yarn end between the tip bunch and package when the tip bunch is removed by subsequent operations. The delay time is adjustable by changing the angular position of cam 241 relative to cam 240 on the common cam shaft 239. This adjustment may be required to accommodate various builder stroke lengths.

Cam 241 is so positioned on the shaft 239 that the adjacent cam follower 245 is on the high part of the cam, thus holding the NC contacts of adjacent switch 222 open and closing them for only a short time, as shown graphically in FIGURE 13.

The ring rail 26 remains in the tip bunch building position for a certain time period, to wind an approximately predetermined number of wraps of yarn into the tip bunch prior to lowering of the ring rail. This time period needed to apply the tip bunch is also adjustable and is determined by the angular position of cam 242 relative to cam 241. It is to be noted here that cam 242 does not directly energize the ring rail lowering solenoid 230 but does this over the relay 225.

The builder chain rewind unit 85 is simultaneously actuated with the tip bunch building escapement unit 115 by the cam 241 and switch 222 over the following path: terminal 1 to NO contact of switch 220 to common contact of switch 222 to NC and now closed contact of switch 222 to terminal 4 to the coil of chain rewind unit solenoid 224 to terminal 10 of terminal strip 206.

The actuation circuit for the rewind unit 85 actuates the rewind unit solenoid, which releases the roller brake of said unit, allowing the spring-loaded pulley to rewind the builder chain as fully described in application Ser. No. 372,972.

After a sufficient amount of yarn is applied to the tip bunch, the ring rail is lowered. The circuit for the solenoid 230 of the ring rail lowering unit 55 is energized by the relay switch 225. The coil 227 of the relay switch is energized by cam 242 and timer switch 226. Cam 242 holds the NC contacts of timer switch 226 open during the time the timer motor 210 is stopped and during the tip bunch building interval. When turning cam 242 allows the cam follower 246 to drop into its peripheral recess, relay coil 227 is energized over the following path: terminal 1 to NO contact of switch 220 to common contact of switch 226 to NC and now closed contact of switch 226 to coil 227 to NC contacts 228 of stop switch 213 to terminal 3 of terminal strip 206. The relay switch 225 is actuated and closes two circuits and opens one circuit; namely, closes its own holding circuit, closes the actuation circuit for ring rail lowering unit 55, and opens the start-up circuit for main motor starter 218 for the time period during which the relay switch is engaged.

The holding circuit for the relay switch 225 has the following path: terminal 1 to NO contact 211 of start switch 212 to common contacts 229 of relay switch 225 to NO but now closed contact of the relay switch to the coil 227 thereof to NC contacts 228 of stop switch 213 to terminal 3 of terminal strip 206.

The actuation circuit for the ring rail lowering unit 55 has the following path: terminal 1 to NO contact 211 of start switch 212 to common contacts 229 of relay switch to NO but now closed contact of relay switch to terminal 5 of strip 206 to coil of ring rail lowering solenoid 230 to terminal 8.

The opened (now incomplete) start-up circuit for the main motor starter 218 has the following path: terminal 1 to NO contact 211 of start switch 212 on head end to common contacts 229 of relay switch 225 to NC but now open contact of relay switch to NO contacts 219 of start switch 212 to terminal 7 to self-holding contact 217 of main motor starter 218 to coil 231 of said starter to overload contacts 233 and 234 to grounded terminal 207 of transformer 201.

The holding circuit for the relay switch 225 holds the relay engaged indefinitely after timer switch 226 has opened again and after timer motor has stopped.

The energized engaging solenoid 230 engages the clutch heads of ring rail lowering unit 55 and lowers the ring rail until the shoulder of the driven clutch head 66 engages the internal fixed stop 176, as shown in FIGURE 2. Upon engagement between the driven clutch head and fixed stop, the overload clutch 42–43 begins to slip holding the driven clutch head 66 secured against the fixed stop, maintaining the ring rail 26 in its lowest position even after the spinning frame is stopped, until the engaging solenoid 230 is de-energized, as will be further discussed.

After the ring rail lowering operation is completed, revolving cam 243 raises the cam follower 238 of switch 214 and opens the NC contacts of switch 214, breaking the holding circuit for the starter coil 231 of the main motor. This circuit has the following path: terminal 1 to NO contact 211 of start switch 212 to NC contacts of stop switch 213 to common contact of timer switch 214 to NC but now open contact of timer switch 214 to terminal 6 to NC contacts of stop switch 216 on foot end to self-holding contacts 217 of main motor starter to holding coil 231 and contacts of overload relays 233 and 234 to grounded transformer terminal 207.

The main motor starter 218 breaks the three-phase high voltage circuit to the main motor 232 and the spinning frame coasts to a stop. Cam 243 of the timer is adjustable in its angular position relative to cam 242, which renders adjustable the time point at which the main motor 232 is de-energized independently from the time point at which the ring rail is lowered, to compensate for variations in the coasting time of different spinning frames. The purpose of this is to hold the number of waste yarn wraps on the spindle or bobbin butt to a minimum.

After the spinning frame has stopped, timer motor 210 remains running until cam 240 breaks the holding circuit for the motor by allowing cam follower 244 to enter the recess of cam 240. The holding circuit was described previously. As pointed out previously, relay switch 225 is still engaged holding the ring rail lowering unit 55 engaged, maintaining the ring rail 26 in its lowest position. This completes the first portion of the automatic cycle and the spinning frame is now ready for doffing.

After doffing of the filled bobbins and the positioning of new empty bobbins on the spindles, the operator presses the stop and release button 213 on the head end of the spinning frame. This breaks the holding circuit for relay coil 227, which circuit was previously described. The relay switch breaks the energizing circuit for ring rail lowering solenoid 230, as previously described. The de-energized ring rail lowering solenoid permits the clutch heads 64 and 66 to disengage and to release the ring rail into the start-up position. Upward movement of the ring rail under influence of counterweights 37 or equivalent springs is controlled by checking unit 117, as described. The spinning frame is still stopped and the start-up circuit for start switch 212 is now pre-closed by the relay switch 225 since the relay switch is de-energized.

When the start-up button of switch 212 is pressed for a short period, two circuits are closed, namely, the actuation circuit for main motor starter 218 and the "shake"

circuit for ring rail lowering unit 55. The actuation circuit for the main motor starter has the following path: terminal 1 to NO contacts of start switch 212 to common contacts 229 of relay switch to NC contact of relay switch to NO but now momentarily closed contacts 219 of start switch 212 to terminal 7 to outside contact of NO self-holding contacts 217 to holding coil 231 and contacts of overload relays 233 and 234 to grounded transformer terminal 207.

The "shake" circuit for the ring rail has the following path: terminal 1 to NO but now momentarily closed contacts 211 of start switch 212 to NO contact on relay switch 225 to terminal 5 to solenoid 230 of ring rail lowering unit to terminal 8 of strip 206.

When the holding coil 231 of starter 218 is energized, the three-phase high voltage circuit for main motor 232 is closed and the spinning frame starts up. Also when the holding coil is energized, self-holding contacts 217 are closed, completing the holding circuit, previously described. At the same time that the spinning frame starts operating, the ring rail lowering unit 55 is actuated as long as the operator holds the button of start switch 212 depressed and is de-activated when the operator releases the button. This enables the operator to shake the ring rail 26 by a manual push button operation and to determine the amount of shake lowering according to his judgment.

The effect of the short shake pull-down simultaneously with spinning frame start-up and the possible repetition of this function is the removal of kink in the yarn which might cause excessive stress in the yarn and breakage during start-up. When the ring rail lowering unit 55 releases the ring rail after shaking, its upward movement is controlled by the hydraulic checking unit 117. This slow upward motion allows time for the ring travelers to accelerate until a steady differential between circumferential bobbin speed and traveler speed is established. This holds excessive yarn tension during start-up to a minimum, reducing yarn end breakage during start-up.

It is to be understood that the forms of the invention herewith shown and described are to be taken as preferred examples of the same, and that various changes in the shape, size and arrangement of parts may be resorted to, without departing from the spirit of the invention or scope of the subjoined claims.

What is claimed is:

1. In a spinning frame of the class having a movable ring rail which is biased upwardly and adapted to be oscillated during a gradual upward movement to build bobbins, cooperating builder motion and ring rail lift means operable to cause oscillation and gradual elevation of the ring rail to build the bobbins, electrical control means operated by the ring rail when the ring rail reaches the full bobbin position to sense the fullness of the bobbins, means operable subsequent to said sensing and connected with the builder motion and lift means to automatically release the ring rail from the control of the builder motion and allow it to shift upwardly to a tip bunch applying position near the upper tips of the bobbins, and electrical time delay means interconnected with said electrical control means and second-named means for delaying the operation of the second-named means from the instant of said sensing so that the ring rail may shift to the tip bunch applying position from the largest practical bobbin diameter.

2. The invention as defined by claim 1, and a checking device connected with said builder motion and ring rail lift means and allowing unrestricted downward travel of the ring rail and checking and controlling the upward travel thereof during the operation of the spinning frame.

3. The invention as defined by claim 1, and an electromechanical ring rail lowering unit connected with said control means and with the ring rail lift means to automatically lower the ring rail to a bobbin doffing position subsequent to the application of tip bunches to the bobbins, said ring rail lowering unit including an overload clutch adapted to slip when the ring rail is fully lowered and the unit is continuing to operate, and timing means connected with said electrical control means, time delay means, second-named means and ring rail lowering unit to coordinate the operation of such unit with the second-named means.

4. The invention as defined by claim 3, and wherein said cooperating builder motion and ring rail lift means includes a flexible element directly interconnecting the builder motion with the lift means, and a separate electrically controlled unit on the builder motion means to automatically rewind the flexible element subsequent to the lowering of the ring rail.

5. The invention as defined by claim 4, and wherein the second-named means is an escapement unit connected directly in said flexible element and operable to increase the length of the flexible element to allow the ring rail to shift to the tip bunch applying position.

6. In a spinning frame of the class having a movable ring rail which is biased upwardly and adapted to oscillate during a gradual upward movement for building bobbins, said spinning frame also having a builder motion including a builder chain connected with the biasing means, an automation system for the spinning frame comprising a limit switch on the spinning frame engageable with the ring rail when the latter has reached the full bobbin position, a ring rail lowering unit including a single engaging solenoid on the spinning frame adapted to lower the ring rail to a doffing position, drive gearing for the ring rail lowering unit continuously driven by the front draft roll gear of the spinning frame, an overload slip clutch means connected in said drive gearing so that the same may continue to drive without overloading the parts of the ring rail lowering unit, said unit connected with said biasing means and adapted to override the biasing means when activated by the single engaging solenoid, a checking device on the spinning frame connected with the biasing means and controlling at all times the upward movement of the ring rail by the biasing means and allowing unobstructed downward movement of the ring rail by said lowering unit, a solenoid-operated escapement unit connected in said builder chain and operable to increase the length of such chain to thereby allow the ring rail to shift upwardly to a tip bunch applying position, a solenoid-operated builder chain rewinding unit on the builder motion and operable to automatically rewind the builder chain after the ring rail is lowered and when the start of a new spinning frame automatic cycle is to begin, and an electrical controller including a power-driven cam and switch timer connected with said limit switch, single engaging solenoid, escapement unit and chain rewinding unit and coordinating the operation of the same in properly timed relation.

7. The invention as defined by claim 6, and wherein said cam and switch timer includes means for quickly lowering the ring rail a small distance by the brief reengaging of the ring rail lowering unit substantially simultaneously with automatic starting of the main spinning frame motor to thereby eliminate kinks in the yarn.

8. In a spinning frame of the class having a movable ring rail which is constantly biased upwardly and coordinated lift and builder motion means for the ring rail, automation means for the spinning frame comprising means for sensing the completion of bobbins when the ring rail reaches the full bobbin position, time delay means set into action automatically by the sensing means and connected with the lift and builder motion means and operable to shift the ring rail upwardly to a tip bunch applying position, a checking means connected with the lift and builder motion means to check and control upward movement of the ring rail but allowing free downward movement thereof, ring rail lowering means on the spinning frame interconnected with said lift and builder motion means and capable of overcoming the control of the latter for lowering the ring rail to a doffing position, means on the spinning frame to rewind automatically the chain of the spinning frame builder motion subsequent to the lowering of the ring rail, and control and timing means for all of the components of said automation means to provide substantially a fully automatic cycle of operation for the spinning frame.

9. The invention as defined by claim 8, and wherein the sensing means comprises a limit switch on the spinning frame in the path of movement of the ring rail and directly engaged by the ring rail when the bobbins are full.

10. The invention as defined by claim 8, and wherein said time delay means comprises an electrically-operated escapement unit connected in the builder chain, and an electrical cam and switch timer device forming a part of said control and timing means connected with said escapement unit.

11. The invention as defined by claim 8, and wherein said checking means is a self-contained fluid pressure checking device including an extensible and retractable cylinder-piston unit interconnecting a fixed part of the spinning frame and said lift and builder motion means, a fluid reservoir communicating with the cylinder-piston unit on one side of the piston, a fluid line interconnecting the reservoir and cylinder-piston unit on the opposite side of the piston, and an adjustable flow control valve and one-way check device connected in said fluid line, whereby the checking device is operable to constantly adjustably check upward travel of the ring rail without interfering with its downward travel.

12. The invention as defined by claim 8, and an overload slip clutch means connected with the ring rail lowering means to protect the latter and being adjustable so that a desirable amount of power may still be transmitted through the ring rail lowering means to hold the ring rail in a fully lowered position during slipping of the overload slip clutch means.

13. The invention as defined by claim 12, and wherein the ring rail lowering means includes a positive stop which is active when the ring rail is fully lowered, said overload slip clutch means then commencing slipping and operating without slipping prior to the time at which the positive stop becomes active.

14. The invention as defined by claim 8, and wherein said means to rewind the chain of the builder motion is a rewind unit mounted directly on the builder motion arm and including a one-way active clutch and a brake device which is one-way active oppositely to the clutch, and a solenoid connected to the brake device to release the same when dictated by the control and timing means.

15. In a spinning frame of the class having a movable ring rail which is biased upwardly and adapted to be oscillated during a gradual upward traversing of bobbins, cooperating builder motion and ring rail lift means operable to cause oscillation and gradual elevation of the ring rail, electrical means operated by the ring rail when the ring rail reaches a full bobbin position to sense the fullness of bobbins, electromechanical means operable after said sensing and connected with said builder motion and lift means to automatically lower the ring rail toward a bobbin doffing position, and electromechanical time delay means interconnected with said electrical means and electromechanical means and delaying the operation of the latter from the instant of said sensing so that the ring rail may be lowered toward said doffing position from substantially the largest bobbin diameter.

16. The invention as defined by claim 15, and wherein said electrical means includes a limit switch in the path of movement of the ring rail and said time delay means includes a timer motor, timing cams driven by said motor and timing switches operated by said cams, said switches electrically connected with said limit switch.

17. The invention as defined by claim 16, and manually operable start and ring rail shake and stop and release switches electrically interconnected between said time delay switches and limit switch.

18. The invention as defined by claim 17, and a relay switch electrically connected with said manually operable switches and with at least one of said timing switches.

19. In a spinning frame of the moveable ring rail type, automation means comprising means for sensing the completion of bobbins when the ring rail reaches a full bobbin position, time delay means activated automatically by said sensing means, means operable after a time delay interval to cause movement of the ring rail to another working position relative to the bobbins, and electrical circuit means including manually operable switch means to terminate the cycle of operation of the spinning frame and to release the ring rail to a starting position for a new cycle of operation and to initiate said new cycle.

20. In a spinning frame of the movable ring rail type, builder motion and cooperating ring rail lift means to cause traversing of the ring rail over bobbins, electrical sensing means including a limit switch in the path of movement of the ring rail to detect the full bobbin position of the ring rail, an electrically operated ring rail lowering means connected with said sensing means to lower the ring rail from a full bobbin position to a doffing position, and an adjustable timing device connected with the main motor of the spinning frame and operable to de-energize said main motor independently from the time at which the ring rail is lowered to compensate for the variations in the coasting time of different spinning frame types and to thereby minimize the number of waste yarn wraps on the spindles.

21. In a movable ring rail spinning machine, means to oscillate and raise the ring rail relative to bobbins, means to detect the full bobbin position of the ring rail, means set into motion by said detecting means to automatically lower the ring rail to a doffing position, and a timing mechanism, said mechanism being adjustable and serving to establish a time delay interval between the time when the ring rail reaches the full bobbin position and when it is lowered, said mechanism also serving to establish a second time delay interval to render adjustable the time point at which the main spinning frame motor is de-energized independently of the time point at which the ring rail is automatically lowered.

22. The invention as defined by claim 3, and wherein said cooperating builder motion and ring rail lift means includes a flexible element, and means on the builder motion means to automatically rewind the flexible element subsequent to lowering of the ring rail.

23. In a movable ring rail spinning frame, means to oscillate and gradually raise the ring rail relative to bobbins on said frame, means to detect the position of the ring rail near the tops of the bobbins when the bobbins are full, means activated by the last-named means to automatically lower the ring rail to a bobbin doffing position and to hold the ring rail in such position during doffing of the bobbins and the application of new empty bobbins to spindles of the frame, means to interrupt the operation of the main spinning frame motor after said automatic lowering of the ring rail, means for again starting the operation of the main spinning frame motor and to substantially simultaneously reactivate said ring rail lowering means for a short time interval for the purpose of shaking the ring rail to eliminate yarn kinks.

24. In a spinning frame of the movable ring rail type, builder motion and cooperating ring rail lift means to cause traversing of the ring rail cover bobbins, a full bobbin sensing switch operable to detect the full condition of bobbins on the spinning frame after said traversing, an electrically operated ring rail lowering means connected with the sensing switch to lower the ring rail from a full bobbin position to a doffing position, and means to automatically rewind the builder motion means when the ring rail is lowered to a doffing position, and time delay means connected with said sensing switch and ring rail lowering means and delaying the operation of the latter from the instant of sensing so that the ring rail may be lowered to the doffing position from the most advantageous bobbin diameter.

References Cited

UNITED STATES PATENTS

| | | | |
|---|---|---|---|
| 2,798,356 | 7/1957 | Christiansson | 57—54 |
| 3,113,414 | 12/1963 | Negishi | 57—54 |
| 3,124,925 | 3/1964 | Kennedy et al. | 57—54 |
| 3,138,339 | 6/1964 | Jones | 57—54 |
| 3,256,683 | 6/1966 | Anderson et al. | 57—54 |

OTHER REFERENCES

German application, DAS, 1,062,152, printed July 1959.

FRANK J. COHEN, *Primary Examiner.*

W. H. SCHROEDER, *Assistant Examiner.*